(12) United States Patent
Rivers-Moore et al.

(10) Patent No.: US 7,430,711 B2
(45) Date of Patent: Sep. 30, 2008

(54) SYSTEMS AND METHODS FOR EDITING XML DOCUMENTS

(75) Inventors: Jonathan E. Rivers-Moore, Bellevue, WA (US); Eugene N. Veselov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 165 days.

(21) Appl. No.: 10/781,586

(22) Filed: Feb. 17, 2004

(65) Prior Publication Data
US 2005/0183006 A1   Aug. 18, 2005

(51) Int. Cl.
*G06F 17/00* (2006.01)

(52) U.S. Cl. .................. 715/221; 715/234; 715/223

(58) Field of Classification Search .......... 715/500, 715/513, 501.1, 530, 522, 523, 505, 221, 715/223, 234–236, 205
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,933,880 A | 6/1990 | Borgendale et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,204,947 A | 4/1993 | Bernstein et al. | |
| 5,206,951 A | 4/1993 | Khoyi et al. | |
| 5,218,672 A | 6/1993 | Morgan et al. | |
| 5,222,160 A | 6/1993 | Sakai et al. | |
| 5,228,100 A | 7/1993 | Takeda et al. | |
| 5,237,680 A | 8/1993 | Adams et al. | |
| 5,249,275 A | 9/1993 | Srivastava | |
| 5,274,803 A | 12/1993 | Dubin et al. | |
| 5,297,249 A | 3/1994 | Bernstein et al. | |
| 5,297,283 A | 3/1994 | Kelly, Jr. et al. | |

(Continued)

FOREIGN PATENT DOCUMENTS

EP    1221661    7/2002

(Continued)

OTHER PUBLICATIONS

Clarke, P., "From small beginnings," Knowledge Management, Nov. 2001, pp. 28-30.

(Continued)

*Primary Examiner*—Thu Huynh

(57) ABSTRACT

A system and method capable of identifying that a node of an extensible markup language (XML) document is editable using an element of an electronic-form template is described. In at least some embodiments, the system and method are capable of determining operations that are permitted for the identified node using another element of the electronic-form template.

25 Claims, 14 Drawing Sheets

U.S. PATENT DOCUMENTS

| | | |
|---|---|---|
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,608,720 A | 3/1997 | Biegel et al. |
| 5,625,783 A | 4/1997 | Ezekiel et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,740,439 A | 4/1998 | Atkinson et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,683 A | 6/1998 | Logan et al. |
| 5,764,984 A | 6/1998 | Loucks |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,838,906 A | 11/1998 | Doyle et al. |
| 5,842,018 A | 11/1998 | Atkinson et al. |
| 5,854,630 A | 12/1998 | Nielsen |
| 5,862,372 A | 1/1999 | Morris et al. |
| 5,862,379 A | 1/1999 | Rubin et al. |
| 5,910,895 A | 6/1999 | Proskauer et al. |
| 5,928,363 A | 7/1999 | Ruvolo |
| 5,929,858 A | 7/1999 | Shibata et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,072,870 A | 6/2000 | Nguyen et al. |
| 6,078,326 A | 6/2000 | Kilmer et al. |
| 6,081,610 A | 6/2000 | Dwork et al. |
| 6,088,708 A | 7/2000 | Burch et al. |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,154,128 A | 11/2000 | Wookey et al. |
| 6,163,772 A | 12/2000 | Kramer et al. |
| 6,167,521 A | 12/2000 | Smith et al. |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,199,204 B1 | 3/2001 | Donohue |
| 6,209,128 B1 | 3/2001 | Gerard et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,374 B1 | 6/2001 | Dresevic et al. |
| 6,263,313 B1 | 7/2001 | Milsted et al. |
| 6,268,852 B1 | 7/2001 | Lindhorst et al. |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,292,897 B1 | 9/2001 | Gennaro et al. |
| 6,300,948 B1 | 10/2001 | Geller et al. |
| 6,307,955 B1 | 10/2001 | Zank et al. |
| 6,308,273 B1 | 10/2001 | Goertzel et al. |
| 6,311,271 B1 | 10/2001 | Gennaro et al. |
| 6,314,415 B1 | 11/2001 | Mukherjee |
| 6,321,334 B1 | 11/2001 | Jerger et al. |
| 6,342,907 B1 | 1/2002 | Petty et al. |

| | | |
|---|---|---|
| 6,343,149 B1 | 1/2002 | Motoiwa |
| 6,343,302 B1 | 1/2002 | Graham |
| 6,345,256 B1 | 2/2002 | Milsted et al. |
| 6,345,361 B1 | 2/2002 | Jerger et al. |
| 6,351,574 B1 | 2/2002 | Yair et al. |
| 6,356,906 B1 | 3/2002 | Lippert et al. |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,389,434 B1 | 5/2002 | Rivette et al. |
| 6,405,221 B1 | 6/2002 | Levine et al. |
| 6,414,700 B1 | 7/2002 | Kurtenbach et al. |
| 6,421,070 B1 | 7/2002 | Ramos et al. |
| 6,434,564 B2 | 8/2002 | Ebert |
| 6,449,617 B1 | 9/2002 | Quinn et al. |
| 6,457,009 B1 | 9/2002 | Bollay |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,702 B1 | 12/2002 | Adar et al. |
| 6,501,864 B1 | 12/2002 | Eguchi et al. |
| 6,502,101 B1 | 12/2002 | Verprauskus et al. |
| 6,505,300 B2 | 1/2003 | Chan et al. |
| RE38,070 E | 4/2003 | Spies et al. |
| 6,546,546 B1 | 4/2003 | Van Doorn |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,578,144 B1 | 6/2003 | Gennaro et al. |
| 6,581,061 B2 | 6/2003 | Graham |
| 6,584,469 B1 | 6/2003 | Chiang et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,609,200 B2 | 8/2003 | Anderson et al. |
| 6,611,843 B1 | 8/2003 | Jacobs |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,661,920 B1 | 12/2003 | Skinner |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Lawrence et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,801,929 B1 | 10/2004 | Donoho et al. |
| 6,816,849 B1 | 11/2004 | Halt, Jr. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,871,220 B1 | 3/2005 | Rajan et al. |
| 6,874,130 B1 | 3/2005 | Baweja et al. |
| 6,876,996 B2 | 4/2005 | Czajkowski et al. |
| 6,889,359 B2 | 5/2005 | Conner et al. |
| 6,901,403 B1 | 5/2005 | Bata et al. |
| 6,915,454 B1 | 7/2005 | Moore et al. |
| 6,931,532 B1 | 8/2005 | Davis et al. |
| 6,941,510 B1 * | 9/2005 | Ozzie et al. ............... 715/513 |
| 6,941,511 B1 | 9/2005 | Hind et al. |
| 6,941,521 B2 | 9/2005 | Lin et al. |
| 6,948,133 B2 | 9/2005 | Haley |
| 6,950,980 B1 | 9/2005 | Malcolm |
| 6,961,897 B1 | 11/2005 | Peel, Jr. et al. |
| 6,963,875 B2 | 11/2005 | Moore et al. |
| 6,968,505 B2 | 11/2005 | Stoll et al. |
| 6,993,714 B2 * | 1/2006 | Kaler et al. ............... 715/513 |
| 6,996,781 B1 | 2/2006 | Myers et al. |
| 7,000,179 B2 | 2/2006 | Yankovich et al. |
| 7,002,560 B2 | 2/2006 | Graham |
| 7,010,580 B1 | 3/2006 | Fu et al. |
| 7,020,869 B2 | 3/2006 | Abrari et al. |
| 7,024,417 B1 | 4/2006 | Russakovsky et al. |
| 7,032,170 B2 | 4/2006 | Poulose |
| 7,051,273 B1 | 5/2006 | Holt et al. |
| 7,058,663 B2 | 6/2006 | Johnston et al. |
| 7,065,493 B1 | 6/2006 | Homsi |
| 7,080,083 B2 | 7/2006 | Kim et al. |
| 7,080,325 B2 | 7/2006 | Treibach-Heck et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,521 B2 | 9/2006 | Santos |
| 7,146,564 B2 | 12/2006 | Kim et al. |
| 7,152,205 B2 | 12/2006 | Day et al. |
| 7,168,035 B1 * | 1/2007 | Bell et al. ............... 715/513 |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,213,200 B2 | 5/2007 | Abe et al. |
| 7,236,982 B2 | 6/2007 | Zlatanov et al. |
| 7,272,789 B2 | 9/2007 | O'Brien |
| 7,281,018 B1 | 10/2007 | Begun et al. |
| 7,296,017 B2 | 11/2007 | Larcheveque et al. |
| 7,313,758 B2 | 12/2007 | Kozlov |
| 7,316,003 B1 | 1/2008 | Dulepet et al. |

| | | |
|---|---|---|
| 7,318,237 B2 | 1/2008 | Moriconi et al. |
| 7,334,178 B1 | 2/2008 | Stanciu et al. |
| 2001/0007109 A1 | 7/2001 | Lange |
| 2001/0022592 A1 | 9/2001 | Alimpich et al. |
| 2001/0024195 A1 | 9/2001 | Hayakawa |
| 2001/0037345 A1 | 11/2001 | Kiernan et al. |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0013788 A1 | 1/2002 | Pennell et al. |
| 2002/0019941 A1 | 2/2002 | Chan et al. |
| 2002/0023113 A1 | 2/2002 | Hsing et al. |
| 2002/0026441 A1 | 2/2002 | Kutay et al. |
| 2002/0026461 A1* | 2/2002 | Kutay et al. ............... 707/523 |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1* | 3/2002 | Reynar et al. ............... 707/513 |
| 2002/0040469 A1 | 4/2002 | Pramberger |
| 2002/0054126 A1 | 5/2002 | Gamon |
| 2002/0065798 A1 | 5/2002 | Bostleman et al. |
| 2002/0065847 A1 | 5/2002 | Furukawa et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083318 A1 | 6/2002 | Larose |
| 2002/0099952 A1 | 7/2002 | Lambert et al. |
| 2002/0100027 A1 | 7/2002 | Binding et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay et al. |
| 2002/0174417 A1 | 11/2002 | Sijacic et al. |
| 2002/0178380 A1 | 11/2002 | Wolf et al. |
| 2002/0184219 A1 | 12/2002 | Preisig et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0007000 A1 | 1/2003 | Carlson et al. |
| 2003/0014397 A1 | 1/2003 | Chau et al. |
| 2003/0018668 A1* | 1/2003 | Britton et al. ............... 707/513 |
| 2003/0020746 A1 | 1/2003 | Chen et al. |
| 2003/0023641 A1 | 1/2003 | Gorman et al. |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0037303 A1 | 2/2003 | Bodlaender et al. |
| 2003/0043986 A1 | 3/2003 | Creamer et al. |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0056198 A1 | 3/2003 | Al-Azzawe et al. |
| 2003/0061386 A1 | 3/2003 | Brown |
| 2003/0061567 A1 | 3/2003 | Brown et al. |
| 2003/0084424 A1 | 5/2003 | Reddy et al. |
| 2003/0093755 A1 | 5/2003 | O'Carroll |
| 2003/0110443 A1 | 6/2003 | Yankovich et al. |
| 2003/0120651 A1 | 6/2003 | Bernstein et al. |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0200506 A1 | 10/2003 | Abe et al. |
| 2003/0204511 A1 | 10/2003 | Brundage |
| 2003/0204814 A1 | 10/2003 | Elo et al. |
| 2003/0205615 A1 | 11/2003 | Marappan |
| 2003/0212902 A1 | 11/2003 | van der Made |
| 2003/0217053 A1 | 11/2003 | Bachman et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri |
| 2003/0225829 A1 | 12/2003 | Pena et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002939 A1 | 1/2004 | Arora |
| 2004/0003353 A1 | 1/2004 | Rivera et al. |
| 2004/0003389 A1 | 1/2004 | Reynar et al. |
| 2004/0030991 A1 | 2/2004 | Hepworth et al. |
| 2004/0039990 A1 | 2/2004 | Bakar et al. |
| 2004/0039993 A1 | 2/2004 | Kougiouris et al. |
| 2004/0044965 A1 | 3/2004 | Toyama et al. |
| 2004/0054966 A1 | 3/2004 | Busch et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0088652 A1 | 5/2004 | Abe et al. |
| 2004/0107367 A1 | 6/2004 | Kisters |
| 2004/0117769 A1 | 6/2004 | Lauzon et al. |
| 2004/0146199 A1 | 7/2004 | Berkner et al. |
| 2004/0163041 A1* | 8/2004 | Engel ............... 715/513 |
| 2004/0172442 A1 | 9/2004 | Ripley |
| 2004/0181711 A1 | 9/2004 | Johnson et al. |
| 2004/0186762 A1 | 9/2004 | Beaven et al. |
| 2004/0189716 A1 | 9/2004 | Paoli et al. |
| 2004/0194035 A1 | 9/2004 | Chakraborty |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler |
| 2004/0205592 A1* | 10/2004 | Huang ............... 715/513 |
| 2004/0205605 A1 | 10/2004 | Adler et al. |
| 2004/0205671 A1 | 10/2004 | Sukehiro et al. |
| 2004/0210599 A1 | 10/2004 | Friedman et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0261019 A1 | 12/2004 | Imamura et al. |
| 2004/0268229 A1* | 12/2004 | Paoli et al. ............... 715/508 |
| 2005/0015279 A1 | 1/2005 | Rucker |
| 2005/0022115 A1 | 1/2005 | Baumgartner et al. |
| 2005/0027757 A1 | 2/2005 | Kiessig et al. |
| 2005/0033728 A1 | 2/2005 | James |
| 2005/0038711 A1 | 2/2005 | Marlelo |
| 2005/0055627 A1 | 3/2005 | Lloyd et al. |

| | | | |
|---|---|---|---|
| 2005/0060324 A1 | 3/2005 | Johnson et al. | |
| 2005/0060721 A1 | 3/2005 | Choudhary et al. | |
| 2005/0065933 A1 | 3/2005 | Goering | |
| 2005/0065936 A1 | 3/2005 | Goering | |
| 2005/0066287 A1 | 3/2005 | Tattrie et al. | |
| 2005/0071752 A1 | 3/2005 | Marlatt | |
| 2005/0091285 A1 | 4/2005 | Krishnan et al. | |
| 2005/0091305 A1 | 4/2005 | Lange et al. | |
| 2005/0102370 A1 | 5/2005 | Lin et al. | |
| 2005/0102612 A1* | 5/2005 | Allan et al. | 715/513 |
| 2005/0108624 A1 | 5/2005 | Carrier | |
| 2005/0114757 A1 | 5/2005 | Sahota et al. | |
| 2005/0132196 A1 | 6/2005 | Dietl | |
| 2005/0138086 A1 | 6/2005 | Pecht-Seibert | |
| 2005/0171746 A1 | 8/2005 | Thalhammer-Reyero | |
| 2005/0198086 A1 | 9/2005 | Moore | |
| 2005/0198125 A1 | 9/2005 | Beck et al. | |
| 2005/0198247 A1 | 9/2005 | Perry et al. | |
| 2005/0223063 A1 | 10/2005 | Chang et al. | |
| 2005/0223320 A1 | 10/2005 | Brintzenhofe et al. | |
| 2005/0246304 A1 | 11/2005 | Knight et al. | |
| 2005/0268222 A1 | 12/2005 | Cheng | |
| 2006/0020586 A1 | 1/2006 | Prompt et al. | |
| 2006/0026534 A1 | 2/2006 | Ruthfield et al. | |
| 2006/0031757 A9 | 2/2006 | Vincent, III | |
| 2006/0036995 A1 | 2/2006 | Chickles et al. | |
| 2006/0041838 A1 | 2/2006 | Khan | |
| 2006/0059434 A1 | 3/2006 | Boss et al. | |
| 2006/0069605 A1 | 3/2006 | Hatoun | |
| 2006/0069985 A1 | 3/2006 | Friedman et al. | |
| 2006/0080657 A1 | 4/2006 | Goodman | |
| 2006/0085409 A1 | 4/2006 | Rys et al. | |
| 2006/0101037 A1 | 5/2006 | Brill et al. | |
| 2006/0101051 A1 | 5/2006 | Carr et al. | |
| 2006/0129978 A1 | 6/2006 | Abriani et al. | |
| 2006/0143220 A1 | 6/2006 | Spencer, Jr. | |
| 2006/0161559 A1 | 7/2006 | Bordawekar et al. | |
| 2007/0036433 A1 | 2/2007 | Teutsch | |
| 2007/0050719 A1 | 3/2007 | Lui et al. | |
| 2007/0061467 A1 | 3/2007 | Essey | |
| 2007/0061706 A1 | 3/2007 | Cupala | |
| 2007/0074106 A1 | 3/2007 | Ardeleanu | |
| 2007/0094589 A1 | 4/2007 | Paoli | |
| 2007/0100877 A1 | 5/2007 | Paoli | |
| 2007/0101280 A1 | 5/2007 | Paoli | |
| 2007/0118803 A1 | 5/2007 | Walker et al. | |
| 2007/0130504 A1 | 6/2007 | Betancourt et al. | |
| 2007/0208606 A1 | 9/2007 | MacKay et al. | |
| 2007/0208769 A1 | 9/2007 | Boehm et al. | |
| 2008/0028340 A1 | 1/2008 | Davis | |

FOREIGN PATENT DOCUMENTS

| | | |
|---|---|---|
| JP | 63085960 | 4/1988 |
| JP | 401173140 | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |

OTHER PUBLICATIONS

Description of Whitehill Composer software product, produced by Whitehill Technologies, Inc., available at <http://www.xml.com/pub/p/221>, accessed on Apr. 8, 2004, two pages.

Sun, Q., et al., "A Robust and Secure Media Signature Scheme for JPEG Images," Proceedings of 2002 IEEE Workshop on Multimedia Signal Processing, Dec. 2002, pp. 296-299.

Komatsu, N., et al., "A Proposal on Digital Watermark in Document Image Communication and Its Application to Realizing a Signature," Electronics and Communications in Japan, Part I: Communications, vol. 73, No. 5, May 1990, pp. 22-33.

Noore, A., "A Secure Conditional Access System using Digital Signature and Encryption," International Conference on Consumer Electronics, Jun. 2003, pp. 220-221.

Pacheco, X., et al., "Delphi 5 Developer's Guide," Sams Publishing 1999, Section: Data Streaming, 6 pages.

U.S. Appl. No. 60/191,662, Kutay et al.

U.S. Appl. No. 60/203,071, Ben-Natan et al.

"Store and Organize Related Project Files In a Binder," Getting Results with Microsoft Office, 1990, pp. 109-112.

Barker et al., "Creating In-Line Objects Within An Integrated Editing Environment," IBM Technical Disclosure Bulletin, vol. 27, No. 5, Oct. 1984, p. 2962.

Berg A., "Naming and Binding: Monikers" Inside OLE, 1995, Chapter 9, pp. 431-490.

Clapp D., "The NeXT Application Kit Part I: Non-Responsive Classes," The NeXT Bible 1990, Chapter 16, pp. 275-293.

DiLascia et al., "Sweeper" Microsoft Interactive Developer, vol. 1, No. 1, 1996, 27 pages.

Herzner et al., "CDAM- Compound Document Access and Management. An Object-Oriented Approach" Multimedia Systems Interaction and Applications, 1992, Chapter 3, pp. 17-36.

Kobayashi et al., "An Update on BTRON-specification OS Development" IEEE 1991 pp. 132-140.

Peterson B., "Unix Variants," Unix Review, vol. 10, No. 4, Apr. 1992, pp. 29-31.

Pike et al., "Plan 9 from Bell Labs" UKUUG, Summer 1990, 10 pages.

Pike et al., "The Use of Name Spaces in Plan 9," Operating Systems Review vol. 27, No. 2, Apr. 1993, pp. 72-76.

Staneck W., "Internal and External Media" Electronic Publishing Unleashed, 1995, Chapter 22, pp. 510-542.

Zdonik S., "Object Management System Concepts," ACM, 1984, pp. 13-19.

Trupin J., "The Visual Programmer," Microsoft Systems Journal, Apr. 1996, pp. 103-105.

Hwang et al., "Micro-Firewalls for Dynamic Network Security with Distributed Intrusion Detection"; IEEE INternational Symposium on Network Computing and Applications; 2001; pp. 68-79.

Kaiya et al., "Specifying Runtime Environments and Functionalities of Downloadable Components Under the Sandbox Mode"; International Symposium on Principles of Software Evolution; 2000; pp. 138-142.

Prevelakis et al., "Sandboxing Applications"; Proceedings of the FREENIX Track; 2001; pp. 119-126.

Schmid et al., "Protection Data from Malicious Software"; 18th Annual Computer Security Applications Conference; 2002; pp. 199-208.

Tomimori et al., "An Efficient and Flexible Access Control Framework for Java Programs in Mobile Terminals"; 22nd International Conference on Distributed Computing Systems Workshops; 2002; pp. 777-782.

OMG XML Metadata Interchange (XMI) Specification Version 1.2 Jan. 2002.

IBM: Stack Algorithm for Extractin Subtree from Serialized Tree, Mar. 1, 1994, TDB-ACC-NONN94033, 3 pages.

Laura Acklen & Read Gilgen, "Using Corel Wordperfect 9", 251-284, 424-434, 583-586 (1998).

Bruce Haiberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.

Leblond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

Atova, "User Reference manual Version 4.4, XML Spy suite 4.4," Atova Ges.m.b.H and Altova, Inc., May 24, 2002, pages cover, copyright pp. 1-565.

Altova et al. XML Spy, XML integrated Development Environments, Altova Inc., 2002, pp. 1-18.

Ben-Natan, U.S. Appl. No. 60/203,081, filed May 9, 2000, entitled "Internet platform for creating and supporting communities".

Ixia Soft, "Steamlining content creation, retrieval, and publishing on the Web using TEXTML Server and SML Spy 4 Suite In an Integrated, Web publishing environment," (Partner's Whitepaper, published on the Web as of Jun. 6, 2002, download pp. 1-16.

Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presisted digital archives".

Altova, Inc., "XML Spy 4.0 Manual," Altova Inc, & Altova GmbH, copyright 1998-2001, Chapters 1, 2, and 6, encompassing pp. 1-17, 18-90, and 343-362.

Cybook, Inc.: "Copying the Search Form to Services-based Web Sites" INternet Article, (online) Jul. 26, 2004. the whole document.

Excel Developer Tip (hereinafter "Excel"), "Determining the Data Type of a Cell", May 13, 1998, p. 1 (available at http://jwalk.com/ss//excel/tips/tip62.htm).

Rado, Dave: "How to create a template that makes it easy for users to "fill in the blanks", without doing any programming" Microsoft Word MVP FAQ Site, (online) Apr. 30, 2004, the whole document.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997), pp. 42-43, 54-58.

"Microsoft Word 2000", Screenshots,(1999), 1-5.

Beauchemin, Dave , "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Borland, Russo , "Running Microsoft Word 97", 314-315, 338, 361-362, 390, and 714-719.

Brabrand, et al., "Power Forms Declarative Client-side Form Field Validation", (2002),1-20.

Dubinko, Micah , "XForms and Microsoft InfoPath", Retrieved from the Internet at http://www.xml.com/lpt/a/1311 on Jan. 21, 2007,(Oct. 29, 2003).

Hoffman, Michael , "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro , et al., "A Dynamic User Interface for Document Assembly", Department of Computer Science, University of Helsinki,(Nov. 2002).

Nelson, Joe , "Client-side Form Validation Using JavaScript", *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan , "Microsoft InfoPath 2003 By Example", Retrieved from the Internet at http://www.perfectxml.com/InfoPath.asp on Jan. 21, 2007,(Apr. 20, 2003).

Udell, Jon , "InfoPath and XForms", Retrieved from the Internet at http://weblog.infoworld.com/udell/2003/02/26.html,(Feb. 26, 2003).

Cover, XML Forms Architecture, retrieved at << http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermedia Corporation, 2006, pp. 7.

Altova, et al., "User and Reference Manual Version 4.4", *www.xmlspy.com*, (May 24, 2007),1-565.

"XForm 1.0", W3C,(Jul. 16, 2001).

Grosso, et al., "XML Fragment Interchange", W3C,(Feb. 2001),1-28.

Anat, Eyal et al., "Integrating and Customizing Hererogeneous E-Commerce Applications", The VLDB Journal-The International Journal on Very Large Data Bases, vol. 10, Issue 1,(Aug. 2001),16-38.

Adams, Susie et al., "BizTalk Unleashed", Sams publishing, 2002, first printing Mar. 2001,(Mar. 2001),1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://www2002.org/CDROM/refereed/321, Printed on May 18, 2004,(May 2002),25 pages.

"Microsoft Word 2000 Screenshots", (2000),11-17.

XMLSPY, "Xmlspy 2004 Enterprise Edition Manual", Altova,(May 17, 2004),1-25, 220-225.

StylusStudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

Pacheco, Xavier et al., "Delphi 5 Developer's Guide", Sams Publishing. Chapter 31, Section: Data Streaming,(1999),4.

Watt, Andrew "Microsoft Office Infopath 2003Kick Start", (Published by Sams) Print ISBN-10;0-672-32623-X, (Mar. 24, 2004), 1-57.

Hu, et al., "A Programmable Editor for Developing Structured Documents based on Bidirectional Transformations", ACM, (Aug. 2004), 178-179.

\* cited by examiner

1202 — Document

1302 — Order: ACME Tire Company | Priority: Normal | Date Ordered:
Charge To: | Date Required:

1304 — Itemized List | Currency:
Summary:

1306 —
| Item Number | Description / Part Number | Quantity | Unit Price | Tax (%) | Pre-Tax Price | Total with Tax |
|---|---|---|---|---|---|---|
| | [Type item description here.] | | | | | |
| | | 1 | 0.00 | 0.000 | 0.00 | 0.00 |

Repeating Table

1308 — Terms
- 
Bulleted List

1310 — Notes

Optional Section

SYSTEMS AND METHODS FOR EDITING XML DOCUMENTS

CROSS REFERENCE TO RELATED PATENT APPLICATION

U.S. patent application having Ser. No. 10/395,505, a filing date of Mar. 24, 2003, for SYSTEM AND METHOD FOR DESIGNING ELECTRONIC FORMS AND HIERARCHICAL SCHEMAS of Paoli, et al is related to this application.

TECHNICAL FIELD

This invention relates to systems and methods for editing an eXtensible Markup Language (XML) document.

BACKGROUND

XML is increasingly becoming the preferred format for transferring information. XML is a tag-based hierarchical language that is extremely rich in terms of the information that it can be used to represent. For example, XML can be used to represent information spanning the spectrum from semi-structured information (such as one would find in a word processing document) to highly structured information (such as that which is contained in a table). XML is well-suited for many types of communication including business-to-business and client-to-server communication. For more information on XML, XSLT, and XML Schema, the reader is referred to the following documents which are the work of, and available from the W3C (World Wide Web consortium): XML 1.0 second edition specification; XSL Transformations (XSLT) Version 1.0; XML Schema section 1: Structures; and XML Schema section 2: Datatypes.

Before information can be transferred, however, it must first be collected. Electronic forms are commonly used to aid in collecting information into an XML document. Electronic forms can be governed by a template, which can provide rules by which an XML document can be presented as an electronic form, such as with data-entry fields for entry of data.

To create these templates, however, a programmer often needs a significant understanding of HTML and XML Schemas. A programmer often needs to understand how data-entry fields in an electronic form governed by the template are represented in the schema, HTML file, and XML document. The programmer also may need to understand how HTML, XML, and XML Schemas are structured and how they inter-relate. Thus, to build a template, a programmer often must have significant experience and skill.

In addition, to use the template, a programmer may need to build a program to allow a user to edit an XML document governed by this template.

For these reasons, creating and using templates can be difficult, time consuming, and require a programmer of significant skill.

SUMMARY

In the following description and figures, an editing application is described that is capable of identifying nodes of an XML document that are editable and operations permitted for those nodes using elements of an electronic-form template.

In one implementation, the editing application presents an XML document as an electronic form having data-entry fields representing nodes of the XML document. The editing application presents those nodes that are identified as editable in a parent element in another XML document governing the first XML document. The editing application enables certain operations for those editable nodes through the data-entry fields if a child element of the parent element identifies them.

BRIEF DESCRIPTION OF THE DRAWINGS

FIG. 13 illustrates an exemplary screen display showing an electronic-form representation of an XML document following an electronic-form template.

The same numbers are used throughout the disclosure and figures to reference like components and features.

DETAILED DESCRIPTION

The following disclosure describes a user-friendly way to design electronic-form templates using components and a form-designing area of a display. Components are presented in an area of a display screen, usually graphically, such as with an arrangement of icons. Icons representing each component are a simplification so that a designer can more easily understand the purpose of and choose from a list of components. A designer can choose each component that he or she wishes to include in an electronic-form template.

The designer can choose a component, such as by clicking on an icon representing a component, and placing it in a form-designing area. The form-designing area is presented in an area of a display screen, usually appearing as a blank page, such as is often done when viewing a new document in a word-processing application. Components placed in a form-designing area can be manipulated by a designer to allow the designer to create an electronic-form template that provides a particular look and feel for an electronic-form representation of an XML document. Also by choosing particular components, a designer can build into the electronic-form template various types of permitted operations (e.g., editing operations).

With each new component added or modified, and in some cases each change made to an electronic-form design view or its hierarchical view, the electronic-form template (and its views) is altered to reflect that change. This incremental building of an electronic-form template and its views, and the fact that the views are linked so that a change to one can almost instantly be reflected in the other, allows a designer to quickly, easily, and intuitively create electronic-form templates.

The resulting electronic-form template reflects a designer's chosen look, feel, and editing options for nodes of XML documents that are to be governed by the electronic-form template. Thus, by following this electronic-form template, nodes of an XML document can be located within the XML document, displayed, and made editable. In one embodiment, an editor application is used to determine, based on this electronic-form template, how nodes of an XML document are to be edited.

For discussion purposes, the visual representation of the components, hierarchical view, electronic-form design view, and XML document are described in the context of a single computer, a set of user-input devices, and a single display screen having areas for displaying a representation of the components, the electronic-form design view, the hierarchical view, and the XML document. The display screen, computer, and user-input devices will be described first, followed by a discussion of the techniques in which these and other devices can be used.

System Architecture

Figure 1:
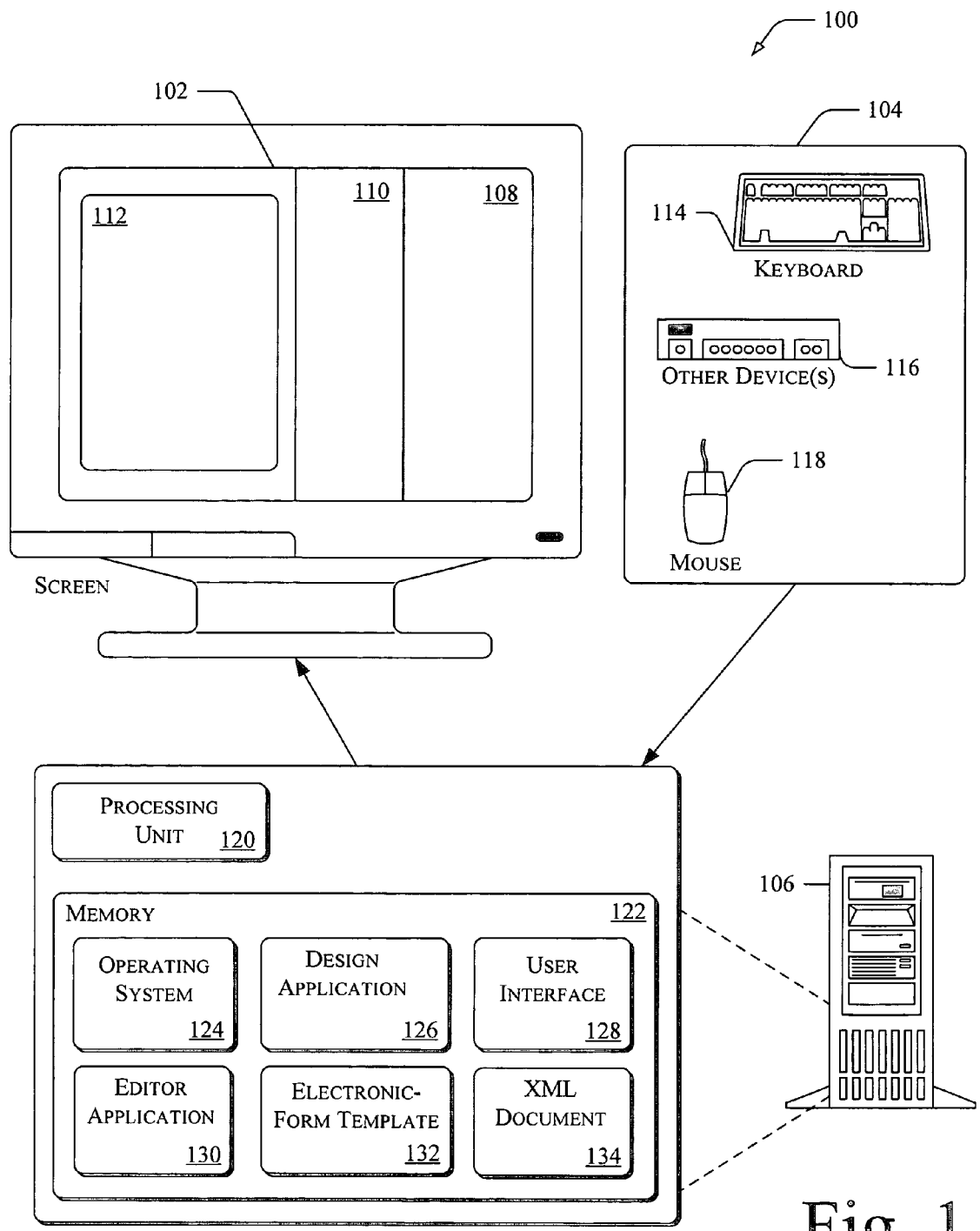
FIG. 1 illustrates a system with a display screen, computer, and user-input devices. The system implements a method for designing an electronic-form template. The system also implements a method for editing XML documents using an electronic-form template.

FIG. 1 shows an exemplary implementation of various devices and applications that can be used to facilitate the creation of an electronic-form template from components and enable editing of XML documents governed by the created electronic-form template.

FIG. 1 shows an exemplary system 100, which comprises a screen 102, user-input devices 104, and a computer 106.

The user-input devices 104 can comprise any device allowing a computer to receive a designer's preferences (or edits from an end-user), such as a keyboard 114, other device(s) 116, and a mouse 118. The other input devices 116 can comprise a touch screen, a voice-activated input device, a track ball, and any other device that allows the system 100 to receive input. The computer 106 comprises a processing unit 120 and random access memory and/or read-only memory 122 including applications, such as an operating system 124, a design application 126, a user interface 128, an editor application 130, an electronic-form template 132, and an XML document 134. The computer 106 communicates with a designer and end-user through the screen 102 and the user-input devices 104.

The screen 102 comprises three displays or screen areas: a hierarchical view display area 108; a component display area 110; and an electronic-form-design area 112. With these areas, a designer can see a representation of and select a component from a list of components. Any part or all of the screen 102 can be used to present an electronic-form representation of the XML document 134. With this representation an end-user can edit or view the XML document 134.

Figure 2:
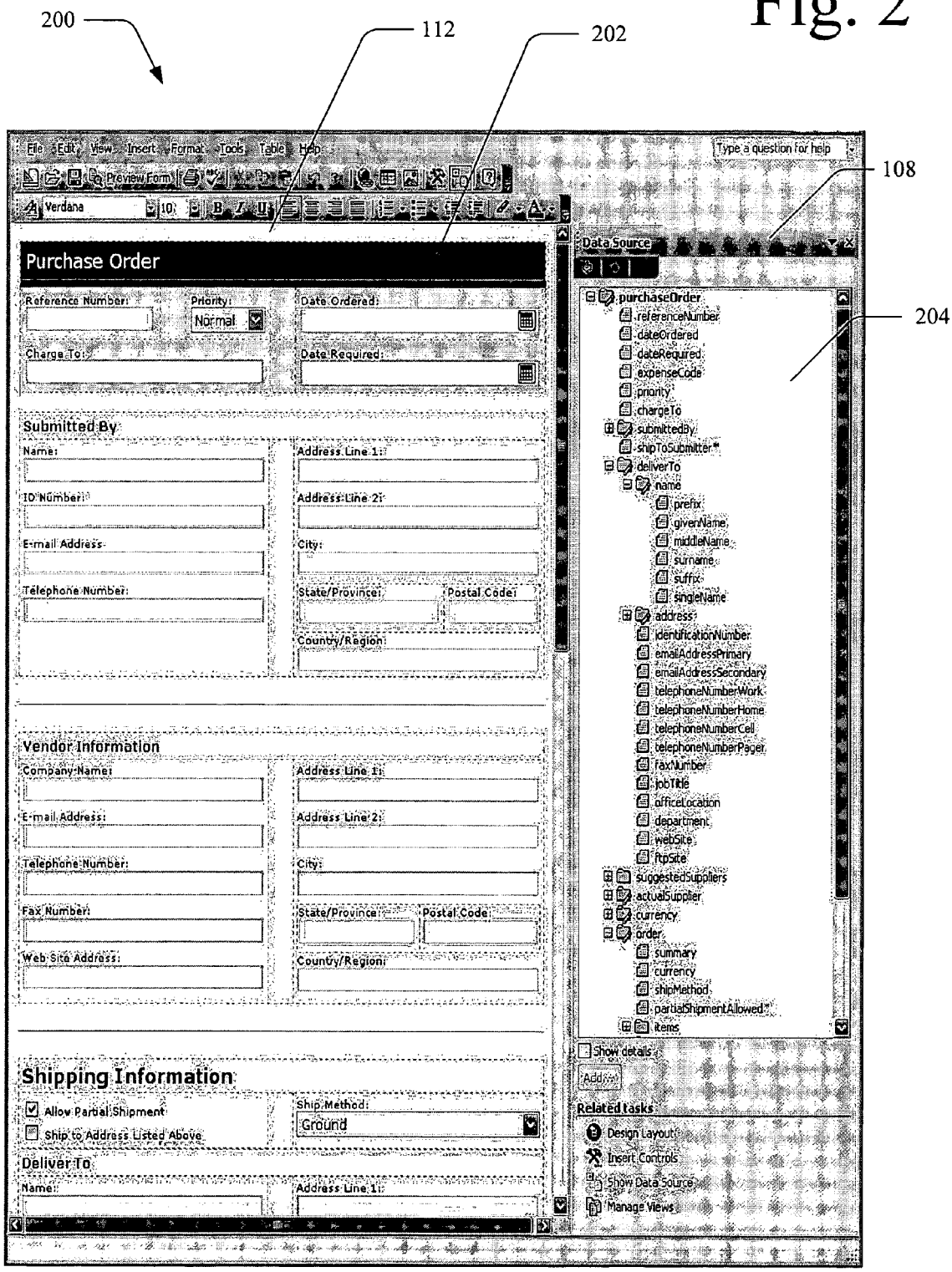
FIG. 2 illustrates an exemplary screen display showing a hierarchical view and a design view of an electronic-form template.

FIG. 2 shows an exemplary design screen 200, including an example of the form-design area 112 and the hierarchical view display area 108 (entitled "Data Source"). Partially within the form-design area 112 is a design view 202 of an exemplary embodiment of the electronic-form template 132. This design view 202 provides information useful to aid a designer in constructing the electronic-form template 132. As will be shown later, an electronic-form representation of the XML document 134 for editing and/or viewing by an end-user (e.g., a data-entry user) can appear similar to this design view 202 of the electronic-form template 132, though this is not necessary. In cases where the electronic-form representation contains data-entry fields and similar user interfaces, these user interfaces can reflect operations permitted by components added to the electronic-form template 132 by the designer.

This electronic-form template 132 shown in the design view 202 is being built from components chosen by a designer. The components chosen are used by the design application 126 to create the data-entry fields shown in the design view 202. These data-entry fields are one way in which the electronic-form template 132 can be represented to a designer or an end-user. These data-entry fields correspond to parts of the electronic-form template 132, the parts also being shown through the icons displayed in the hierarchical view display area 108. The icons displayed are a representation of part of the electronic-form template 132 and are arranged into a tree structure.

Figure 3:
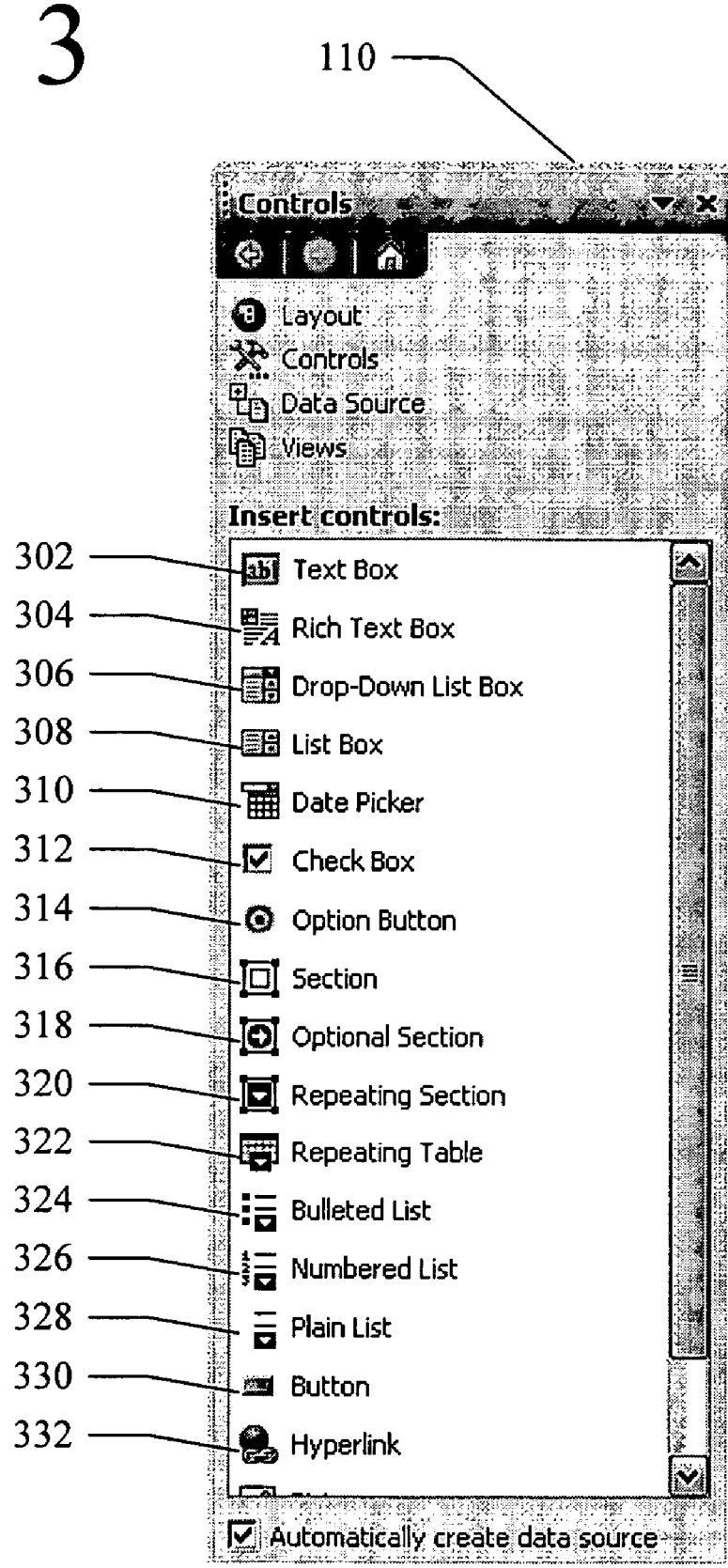
FIG. 3 illustrates an exemplary component display area.

FIG. 3 shows an example of components from which a designer can choose, which are displayed here at the component display area 110. These various components comprise a text box 302, a rich text box 304, a drop-down list box 306, a list box 308, a date picker 310, a check box 312, an option button 314, a section 316, an optional section 318, a repeating section 320, a repeating table 322, a bulleted list 324, a numbered list 326, a plain list 328, a button 330, and hyperlink 332. Other components can be included as well. As described in further detail below, each of these components can be added to indicate an operation or operations that is permitted to be performed on a node or nodes of the XML document 134. By way of example, some of these components will be represented in an electronic form by data-entry fields enabling the component's operation. These data-entry fields can be associated with appropriate nodes of the XML document 134. Thus, when an end-user uses an electronic form's data-entry field to make an entry, for instance, the entry can be reflected in the XML document 134.

With the listed components and other components the system 100 enables a designer to build the electronic-form template 132. These components enable many different possible types of operations (and user interfaces), such as those shown with various data-entry fields in the design view 202 in the form-design area 112 of FIG. 2. The process used to build the electronic-form template 132 will be set forth in greater detail below.

The above devices and applications are merely representative, and other known devices and applications may be substituted for or added to those shown in FIG. 1. One example of another known device that can be substituted for those shown in FIG. 1 is the device shown in FIG. 14. Other examples include portable, handheld, or wireless devices.

Techniques for Building Electronic-Form Templates

Overview

A system, such as the system 100 of FIG. 1, displays components to a designer. The designer can choose from the components to graphically and easily build the electronic-form template 132. The system 100 can also incrementally build the electronic-form template 132 with each new component the designer adds. The system 100 also allows the designer to see two views of the electronic-form template 132, here the design view 202 and the hierarchical view 204.

The system 100 then alters each view with each new component chosen. The designer may also change components existing in the electronic-form template 132, the change to each being incrementally reflected in the views by the system 100.

Figure 4:
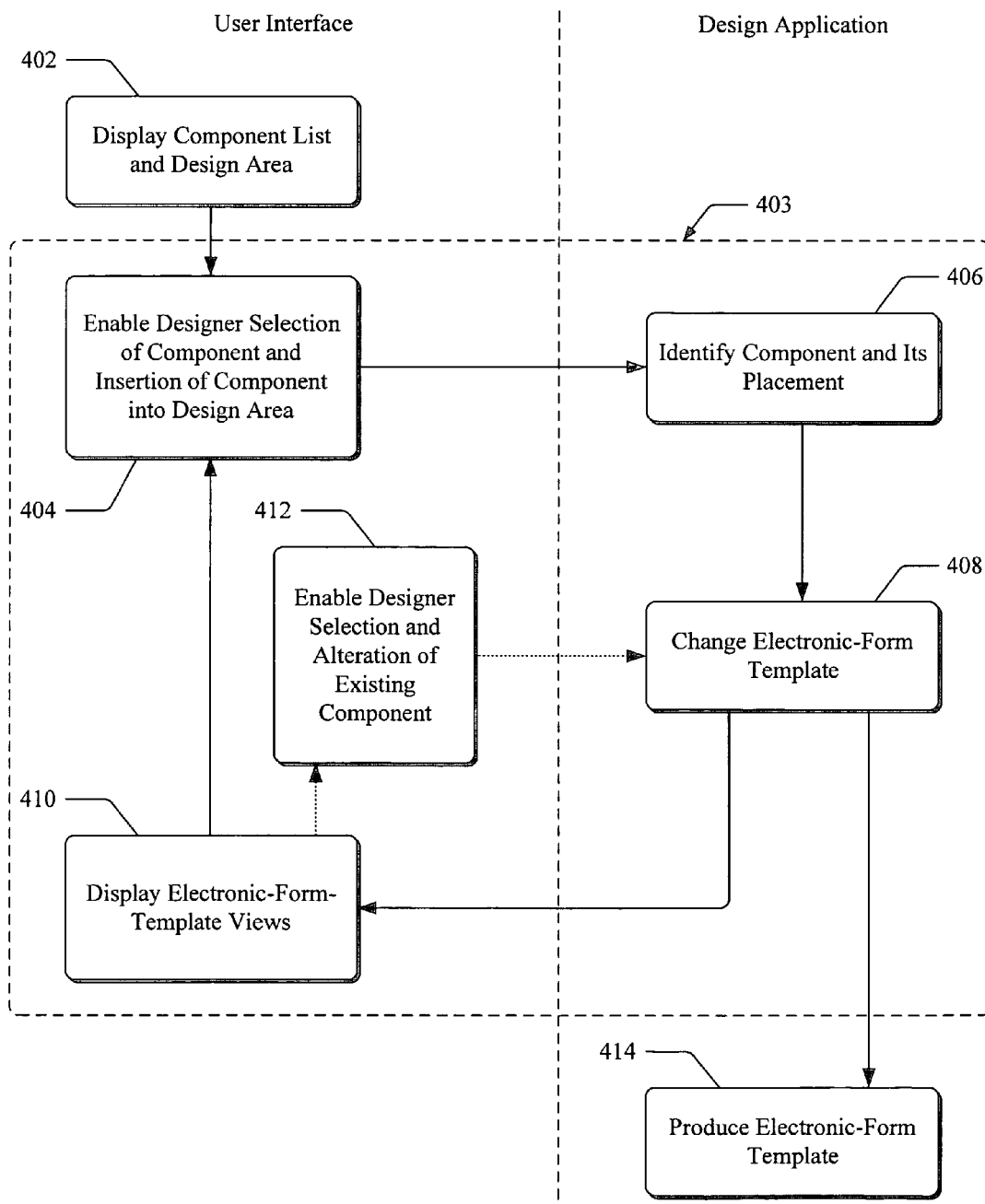
FIG. 4 is a flow diagram of an exemplary process for generating electronic-form templates.

FIG. 4 shows a process 400 for generating the electronic-form template 132. The process 400 and the following processes are illustrated as a series of blocks representing individual operations or acts performed by the system 100. These processes may be implemented in any suitable hardware, software, firmware, or combination thereof. In the case of software and firmware, the processes represent a set of operations implemented as computer-executable instructions stored in the memory 122 and executable by the processing unit 120.

Displaying Components and Form-Design Area

At block 402, the user interface 128 displays components and a form-design area. It does so to enable a designer to graphically design the electronic-form template 132.

Figure 5:
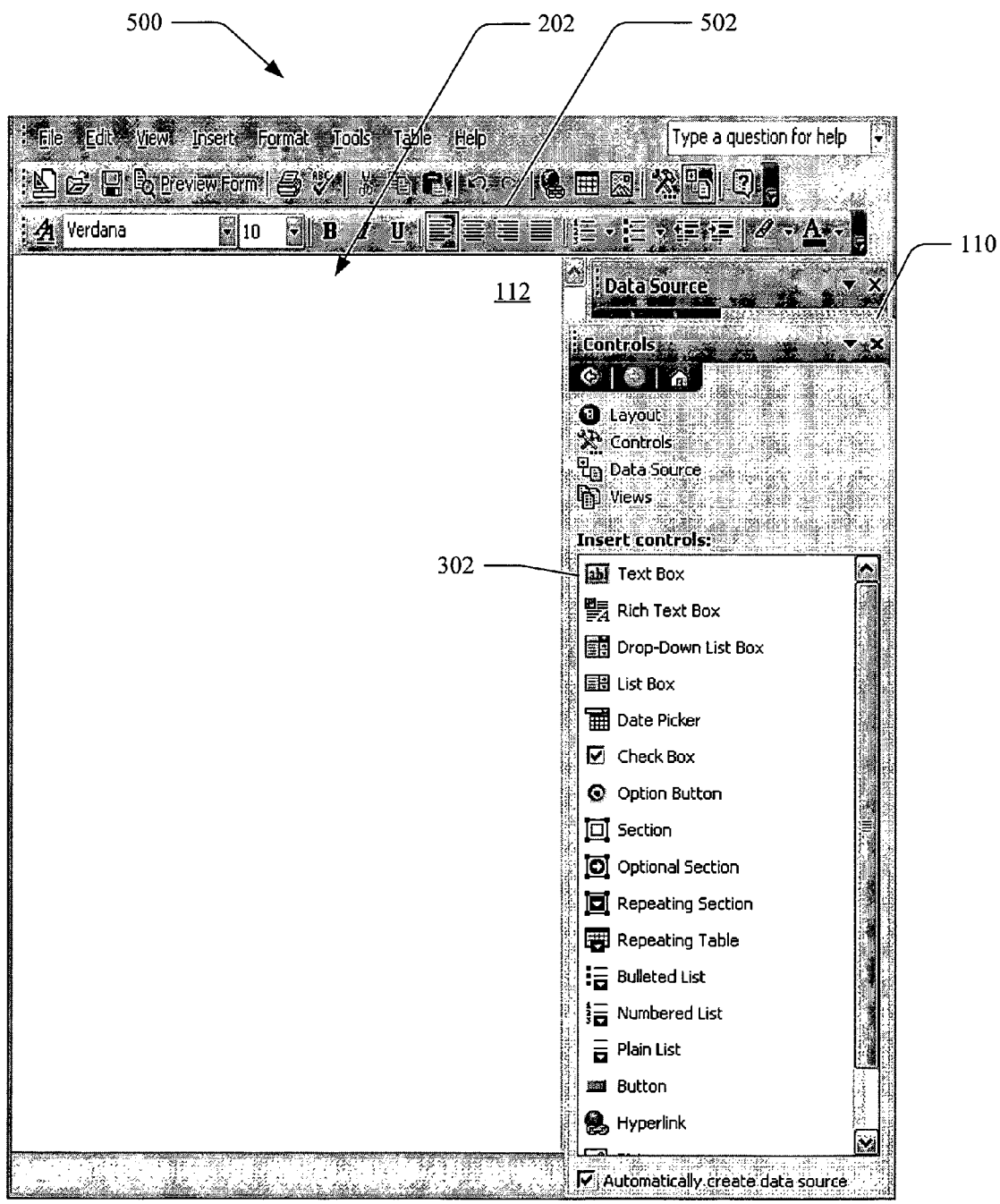
FIG. 5 illustrates an exemplary screen display showing a component display area and a blank form-design area.

FIG. 5 shows a design screen 500 created by the user interface 128, having an example of the component display area 110 and a blank example of the form-design area 112. The form-design area 112 is displayed to make it easy for a designer without typical programming skills to create the electronic-form template 132.

To make it easy, the user interface 128 can provide an editing experience to a designer similar to that commonly provided in word-processing systems. The user interface 128 can, for instance, work like a word-processing system by providing similar font controls and options. In FIG. 5, for example, the user interface 128 displays the form-design area 112 looking like a page from a word-processing application—here, a blank white page. It can also display commonly used icons that represent operations that a designer can choose to perform, such as the font being used (in FIG. 5, Verdana, size 10), bold/underline/italic options, and the like. These word-processing icons can be displayed in many different ways, including as shown in a word-processing icon display 502 of FIG. 5.

Also, as stated elsewhere herein, changes made by the designer to the form-design area 112 can be reflected in the form-design area 112 instantaneously (from the perspective of the designer), further making the design process similar to a typical word-processing experience. By so doing, the user interface 128 makes designing the electronic-form template 132 simpler and more intuitive for a person skilled in word-processing.

The components are displayed by the user interface 128 in the component display area 110 to make it easy for a designer without extensive knowledge of components to be able to understand what each of them can represent in the electronic-form template 132. To show what each component represents, the user interface 128 displays icons and/or text to inform the designer, such as with the icons and text set forth in the component display area 110 set forth in FIGS. 3 and 5. In FIG. 3, for example, the text box 302 comprises an icon (i.e., a symbol) and text describing what a text box component represents. This icon shows a designer that, should he choose to include a text box component in his electronic-form template 132, an operation allowing entry and editing of text for a node in the XML document 134 will be added to the electronic-form template 132. The editor application 130 can then present the node of the XML document 134 in an electronic form as a data-entry field allowing input of text. Like the icon, the text describing the text box 302 ("Text Box") is also descriptive.

With the component display area 110 and the form-design area 112 displayed, the designer can begin to build the electronic-form template 132 and view what an electronic-form representation of the XML document 134 can look like. He can continue to build the electronic-form template 132 by adding components, but can also alter the electronic-form template 132 by altering existing components. This process of building and altering is shown as a design sub-process 403, which includes blocks 404 to 412. The sub-process 403 includes blocks used to describe the action and interaction of the designer and the system 100. When the designer has finished with the electronic-form template 132, the design application 126 produces an electronic-form representation mirroring the operations allowed by the electronic-form template 132 (block 414). The process 403 and the block 414 will be described in greater detail below.

When the component display area 110 and the form-design area 112 are presented, the designer can pick a component from the list of components in the component display area 110 for insertion into the form-design area 112 (block 404). The designer can pick from components in various ways, including through the mouse 118, the other devices 116 (such as a touch screen, track ball, voice-activation, and the like), and through the keyboard 114, which are shown in FIG. 1. To grant flexibility to the designer, the system 100 enables the designer to move the component in the form-design area 112 to where she desires.

A designer can pick a component, for example, by dragging and dropping (from the component display area 110) a component's icon onto a form-design area 112 shown in FIG. 5. The designer can pick a component to drag and drop with various devices, such as with the mouse 118 or commands entered through the keyboard 114. In FIG. 5, the designer clicks on the icon and text for the text box 302 to select it.

How an icon for a component looks may not exactly indicate how it will look in an electronic-form representation of the XML document 134 that follows the electronic-form template 132. Icons, for instance, are often too small to be exact. Rather, icons are designed to indicate functions or operations (e.g., editing functions) associated with nodes of the XML document 134 that choosing the component will permit.

Figure 6:
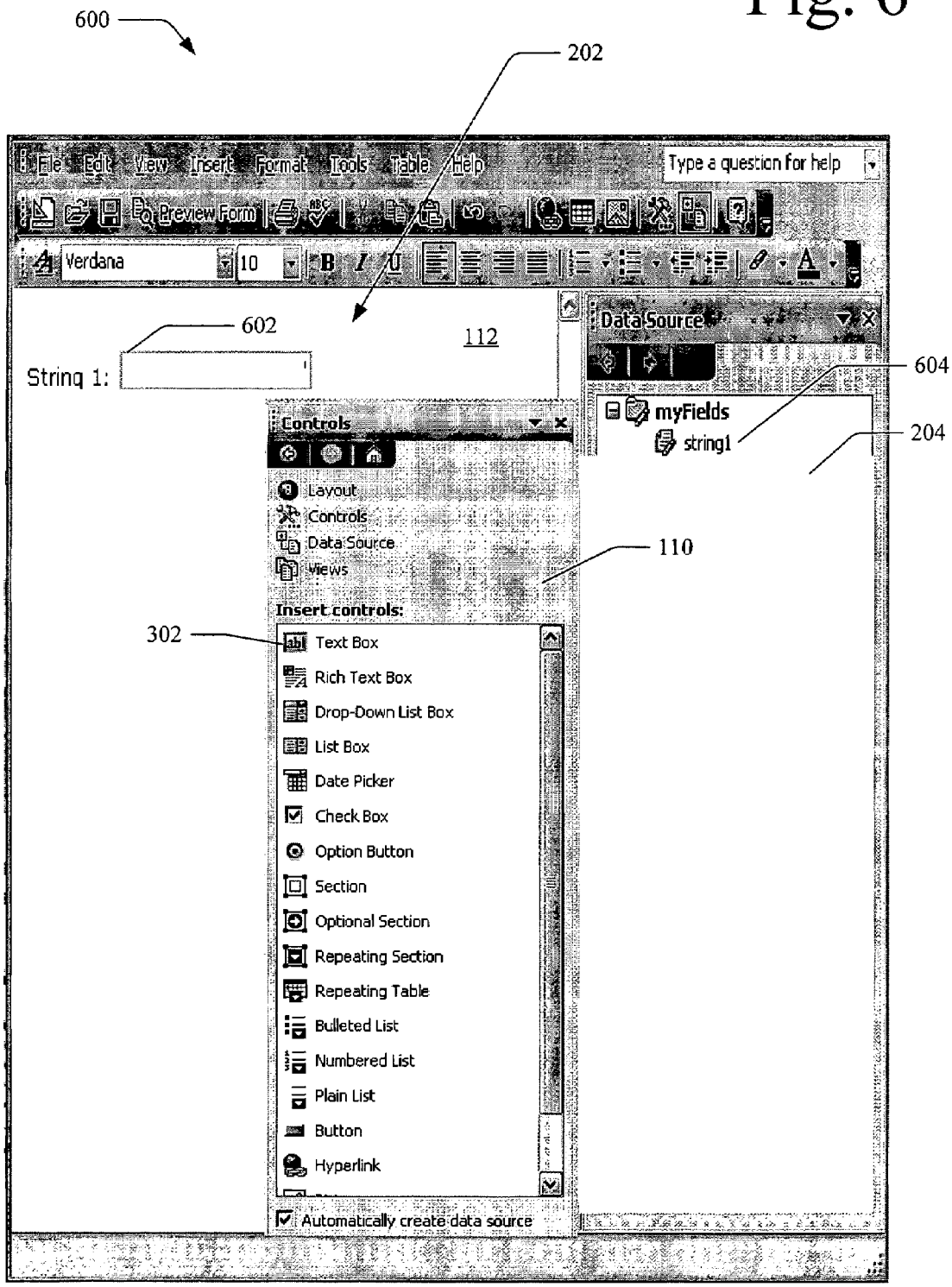
FIG. 6 illustrates an exemplary screen display showing a hierarchical view and a design view of an electronic-form template, and a component display area.

FIG. 6 shows an exemplary screen display 600 showing what the design application 126 creates after a designer selects the text box 302 in FIG. 5 (also shown in FIG. 6). In this example, the system 100 creates a text-function node 604 allowing entry of text, here represented by the text-box data-entry field 602, which looks like a gray box for entry of text and is labeled "String 1:". The design application 126 enables the designer to continue building his electronic-form template 132 by selecting components, thereby creating certain allowed operations associated with nodes of the XML document 134. In this example, the design application 126 created part of the electronic-form template 132 that indicates a permitted function (here a text-entry function) with the text-function node 604.

Building an Electronic-Form Template

Once the system 100 receives a selection of a component and the placement for the component, the system 100 can identify which component was selected, identify the placement for that component on the form-design area 112, build the electronic-form template 132 based on the component chosen and its location, and display the design view 202 and the hierarchical view 204. These tasks are set forth in blocks 406, 408, 410, and 414 of FIG. 4, which will be described below.

In block 406, the design application 126 identifies which component was selected. The system 100 can access and/or contain many components, either from local or remote sources. Some of these components are set forth (via icons and text) in the component display area 110 shown in FIGS. 3, 5, 6, and 7.

Also in the block 406, the design application 126 identifies where a component is placed in the form-design area 112. The placement of the component can alter the structure of the electronic-form template 132. How the placement of a component can alter the electronic-form template 132 will be set forth in greater detail below.

If, for example, a designer chooses the text box 302 from the component display area 110 of FIG. 5, and places the text box 302 in the upper left corner of the form-design area 112, the design application 126 will identify the component and this placement. With this information, the system 100 proceeds to build the electronic-form template 132, which will be described in part using FIGS. 5 and 6.

In block 408, the design application 126 changes the electronic-form template 132 based on a component selected. When a component is added, as has been described in part above, the design application 126 also changes the hierarchical view 204 and the design view 202 of the electronic-form template 132 by building in a representation of the added component. When an existing component is altered (discussed in greater detail below), the design application 126 changes the views to reflect that alteration.

Generally, when a component is added to the form-design area 112, one or more operations are then permitted by the electronic-form template 132. A syntax (also called a "character string") corresponding to each of these permitted operations can be added by the design application 126 to the electronic-form template 132. An exemplary list of operations and their related, operational syntaxes are shown below:

| Component Chosen | Operation Permitted | Syntax Added |
|---|---|---|
| Repeating Section<br>Repeating Table | Insertion of Nodes Before or After Associated Node, and Removal of Nodes | xCollection |
| Optional Section | Insert or Remove Nodes | xOptional |
| Plain List<br>Bulleted List<br>Numbered List | Text Editing of Data Within Associated Node(s), Plus Merge, Split, and Removal of Subordinate Node(s) | xTextList |
| Rich Text Box<br>Text Box | Text Editing of Data Within Associated Node(s) | xField |
| Picture | Insertion of Images Into Associated Node(s) | xImage |

An operation permitted can govern, for instance, how and what kind of information is permitted to be added into a node or nodes of the XML document 134 that is associated with that operational syntax. The node or nodes of the XML document 134 can be associated with the operational syntax. The operational syntax can be associated with a location syntax, such as an XPath expression. Both the operational syntax and the location syntax can be included within an XML element added to the electronic-form template 132. XML elements will be described in greater detail below.

Figure 7:
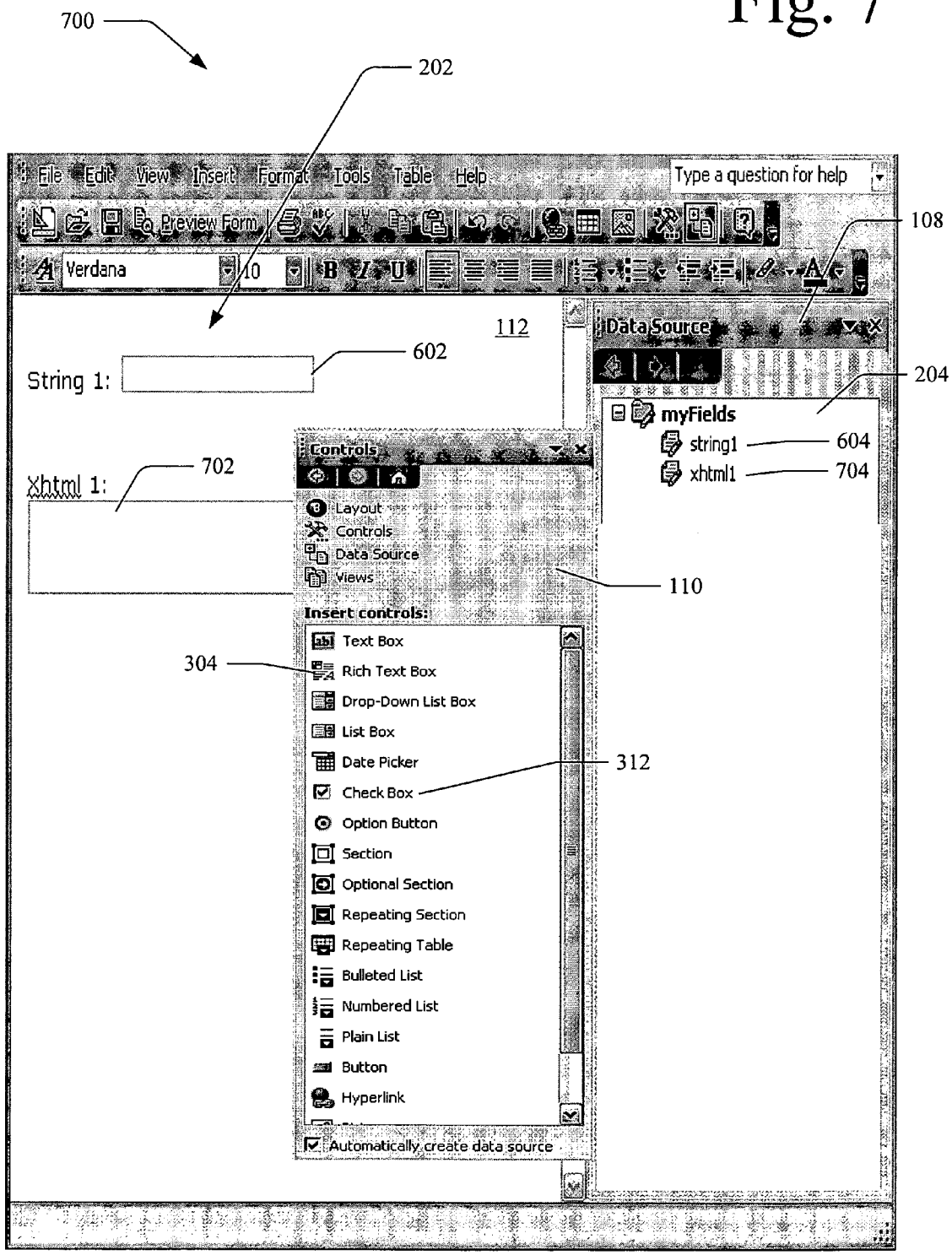
FIG. 7 illustrates the exemplary screen display of FIG. 6 after the electronic-form template comprises another component.

FIG. 7 shows an exemplary screen display 700 showing the continued building of the electronic-form template 132. Here, the designer chose another component (the check box 312 of FIG. 6) to add to the electronic-form template 132 shown in FIG. 6.

In one embodiment, when the designer adds the Rich Text Box component 304 to the form-design area 112, the design application 126 adds the following XML element to the electronic-form template 132:

```
<xsf:xmlToEdit name="xhtml1" item="/myFields/xhtml1" >
    <xsf:editWith type="rich" component="xField" />
</xsf:xmlToEdit>
```

This XML element is an example of an "editability element", described below.

In response to the designer's choice, the design application 126 represents the added editability element as a Rich Text Box 702. As shown in the screen display 700, the Rich Text Box 702 is labeled "Xhtml 1". Also in response to the designer's choice, the design application 126 altered the hierarchical view 204 to include an XHTML section 704 (labeled "xhtml1") corresponding to the Rich Text Box 702 and the editability element.

This editability element comprises XML attributes and additional child elements. These elements and attributes provide information that the editor application 130 can use to determine that a node or nodes of the XML document 134 are editable. These elements and attributes also provide the editor application 130 with information indicating which operations are permitted for these editable nodes.

Syntax of the editability element indicates a name and/or location in the XML document 134 of a node or nodes. With this indicator, the editor application 130 can determine which node or nodes are potentially editable with operations permitted by this editability element. In one implementation, by using all of the electronic-form template 132, the editor application 130 can determine all nodes in the XML document 134 that are potentially editable.

Continuing the ongoing example, the "xmlToEdit" editability element includes an attribute having a character string of "item", associated with an indicator of: "myFields/xhtml1" (the "value" of the attribute). This indicator can be used to determine that nodes having the name and/or location of "myFields/xhtml1" are potentially editable. In this example the indicator comprises an XPath expression being usable to locate node(s) matching this XPath expression.

An additional attribute (a 'container' attribute) can also be included, to indicate contextual conditions, if any, that should be present for the node to be deemed editable. In the ongoing example, there is no 'container' attribute. Thus, in this example, the node indicated by "myFields/xhtml1" is editable without contextual conditions.

Another child XML element, called an "operation element", in the editability element indicates operations (e.g., editing functions) permitted to be performed on or with the node(s) indicated in the editability element. In the ongoing example, the operation element entitled "editWith" indicates that operations associated with "xField" of type "rich" may be applied on or for the nodes indicated by "myFields/xhtml1".

The operation or set of operations indicated by the operation element can be determined from the syntax given in the operation element. Thus, in the ongoing example the syntax "xField" with the additional "type" attribute, with value "rich", indicates an operation of rich-text editing, such as deleting and inserting text, changing the formatting of text, making it bold or italics, and other familiar rich-text editing operations familiar to word-processing. In this example, then, the nodes or data within the nodes indicated by "myFields/xhtml1" may be edited using these operations.

The operation element can indicate permitted operations in various manners. In one implementation, a syntax of the operation element includes an element specifying the XML data able to be inserted by the associated operations.

Thus, the electronic-form template 132 governs how information is handled and operations permitted for the XML document 134 for which it corresponds. Because the electronic-form template 132 comprises an editability element and its parts for each component chosen by the designer, the chosen component affects the syntax of the electronic-form template 132.

With the above syntax and the editability element, each component built into the electronic-form template 132 can govern the look, display, orientation, and size of data-entry field(s), as well as how and where information entered into these data-entry field(s) is mapped, such as to nodes of the XML document 134. The editor application 130 can, however, use less than all of the electronic-form template 132. It can, for instance, determine potentially editable nodes and operations permitted, but use a different look, display, orientation, and size of data-entry fields (or not use data-entry fields at all).

Once the system 100 changes the electronic-form template 132 (block 408), it proceeds to block 410 to display the electronic-form template's 132 design view 202 and hierarchical view 204, or to block 414, to complete the process and produce the electronic-form template 132. Block 410 will be discussed first below, followed later by a discussion of block 414.

In the block 410, the user interface 128 displays the electronic-form template's 132 views. The hierarchical view 204 can be represented in various ways, including by visually showing the hierarchical structure of the electronic-form template 132, if applicable. One example of this is the indentations of the hierarchical view 204 set forth in the hierarchical view display area 108 of FIG. 2.

The electronic-form template 132 can be represented in various ways. The user interface 128 can display the design view 202 to make it easy for a designer to understand the structure of the electronic-form template 132, or can show the electronic-form template 132 without additional information. The design view 202 of the electronic-form template 132 can mimic an electronic-form representation of the XML document 134 potentially seen by a user, such as set forth in the form-design area 112 of FIG. 2. The design view 202 can show components built into the electronic-form template 132 with additional information showing details about the data-entry field or fields corresponding to the components to aid a designer in understanding and altering the components in the electronic-form template 132.

The user interface 128 can also display the hierarchical view 204 in order for the designer to assess the electronic-form template 132 after each change made by the designer. When the designer can quickly see the effect of his changes, the designer can more easily build the electronic-form template 132 to match the designer's intended results. Once the design view 202 is displayed and the hierarchical view 204 is displayed (if desired) in the hierarchical view display area 108, the designer can continue to make changes or end the process. Ending the process will be discussed as part of the block 414, described below.

Continuing the example above, the design application 126 will build the electronic-form template 132 based on the identity and placement of the component.

One of the advantages of the design application 126, and the method it employs, is that the electronic-form template 132 can be built incrementally. That is to say, with each component chosen, or in some implementations with each other action taken that will affect a view of the electronic-form template 132, the electronic-form template 132 is altered. This incrementalism allows a designer to quickly see how the electronic-form template 132 is changing with each change made by the designer. The designer does not have to work on either a form or a schema and then save the form or schema to see how the corresponding schema or form looks or performs. Instead, as the designer makes a change, it is reflected in the views of the electronic-form template 132. This makes designing an electronic-form template 132 easy and intuitive.

In one implementation, the design application 126 can reflect each change made by a designer to both views of the electronic-form template 132 so quickly that the designer sees it in real time, regardless of whether the change was made to the electronic-form template 132 by altering the design view 202 or the hierarchical view 204. By so doing, the designer can more easily design electronic-form templates.

With the new change to electronic-form template 132 shown, the design application 126 continues to enable the designer to add components to the electronic-form template 132, returning to block 404, or alter an existing component, block 412.

If the designer chooses to add another component, the design application 126 enables him to do so in a manner similar to picking the first component as described above. The design view 202 FIG. 2 is one view of an electronic-form template built from many components.

Figure 8:
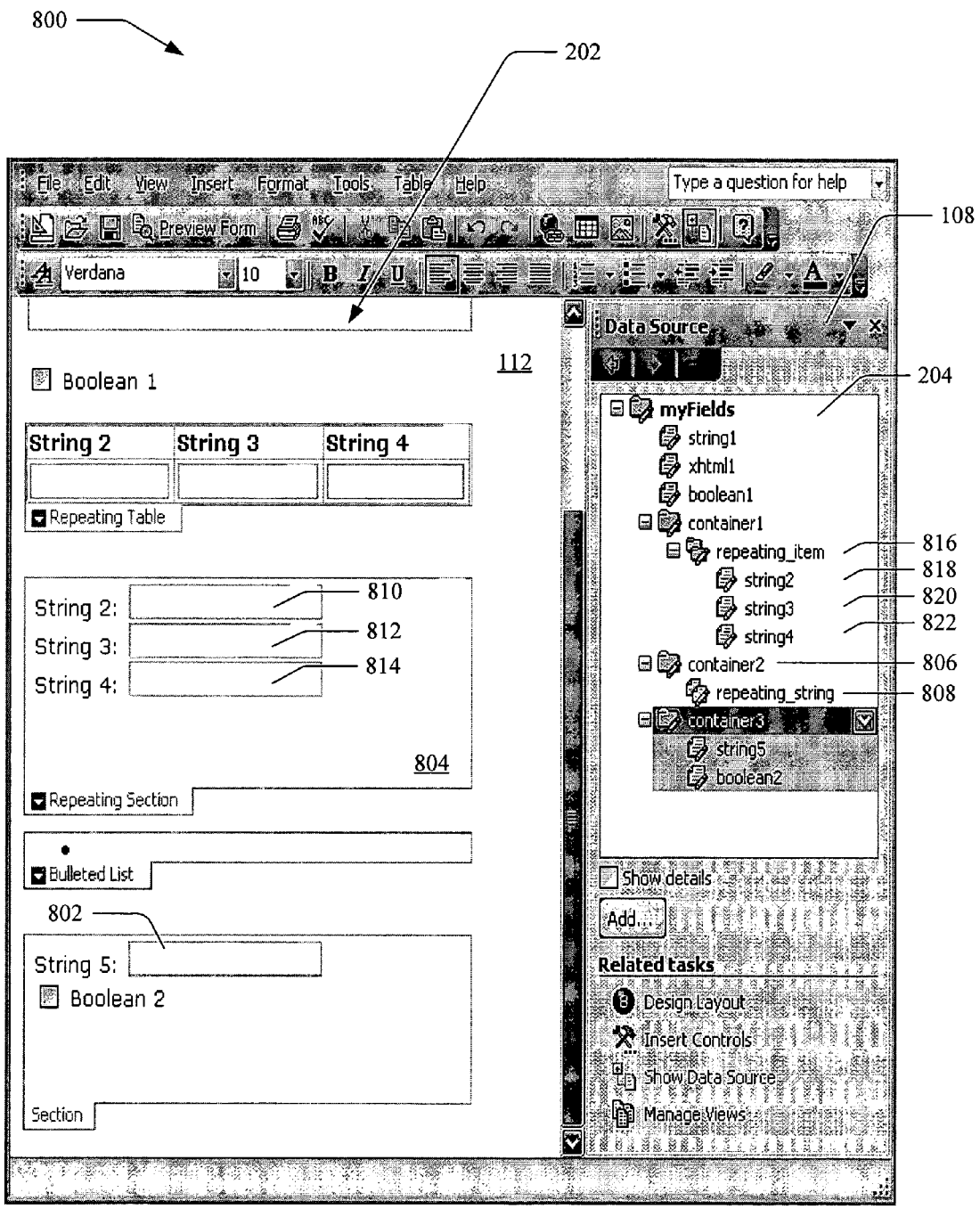
FIG. 8 illustrates the exemplary screen display of FIG. 7 after the electronic-form template comprises other components.

FIG. 8 shows an exemplary design screen 800 showing the continued building of the electronic-form template 132. The design screen 800 shows the views of the electronic-form template 132 from FIGS. 6 and 7, and the results of the designer continuing to choose components. Through this process of adding components to the form-design area 112, a designer can build everything from a simple electronic-form template, such as shown in FIG. 6, to a moderately complex electronic-form template, such as shown FIG. 8, to a large, complex electronic-form template, such as shown in FIG. 2.

In one embodiment, when a designer adds the repeating section component 320 (shown in FIG. 3 and FIG. 6) to the form-design area 112, the design application 126 adds the following editability element to the electronic-form template 132:

```
<xsf:xmlToEdit name="repeating_string"
    item="/myFields/container2/repeating_string"
    container="/myFields /container2" >
    <xsf:editWith component="xCollection"/>
</xsf:xmlToEdit>
```

In this example, the editability element (entitled "xmlToEdit") includes an attribute having a character string of "item", associated with an indicator of: "myFields/container2/repeating_string" (the "value" of the attribute). This indicator gives a name/location of nodes in the XML document 134 that are potentially editable. In this example the indicator comprises an XPath expression being usable to locate (i.e., identify) the nodes.

This editability element also comprises a "container" attribute having a value, in this example, of: "myFields/container2". This attribute determines a dynamic contextual condition for being able to edit the potentially editable nodes indicated by "myFields/container2/repeating_string". In this implementation they are editable only if a node matching the XPath expression: "/myFields/container2" (an ancestor of "myFields/container2/repeating_string") is shown (or rendered) as a section within an electronic-form representation of the XML document 134, and if the user of the editor application has selected a field somewhere within that section. In this example, the condition is met if the data-entry field is rendered within the section corresponding to the "myFields/container2" node's. If not, the editability element does not permit its operations for the potentially editable node(s).

This editability element also contains an operation element entitled "editWith". This operation element indicates that operations associated with "xCollection" may be applied on or for the nodes indicated by "myFields/container2/repeating_string", if the condition is met.

The operation or set of operations indicated by the operation element can be determined from its syntax. Thus, in the ongoing example the syntax "xCollection" indicates a certain set of operations, described in part above. The set indicated by "xCollection" comprises selecting, inserting, deleting, pasting, and copying the potentially editable nodes (indicated by "myFields/container2/repeating_string") or their subordinate nodes.

In the ongoing example, a repeating section 804 is shown in the design view 202 of the XML document 134. This repeating section 804 comprises data-entry fields shown at numerals 810, 812, and 814. These data-entry fields represent the potentially editable nodes for the editability element.

The editor application 130 can determine that the three nodes matching the XPath expression "myFields/container2/repeating_string" can be edited. Thus, by following the electronic-form template 132, the editor application 130 can correctly enable editing according to the "xCollection" syntax of the operation element. In one implementation, the editor 130 can present the data-entry fields 810, 812, and 814 in an electronic form (e.g., through the user interface 128). The editor application 130 can also enable permitted operations on these data-entry fields (and thus their associated nodes of the XML document 134). In this implementation, the editor application 130 enables selection of and insertion, deletion, pasting, and copying of the editable nodes associated with the data-entry fields 810, 812, and 814.

Returning to the process 400 of FIG. 4, a designer can simply make a change, like adding a component, to a view and see the change applied to both views. In this sense, the design view 202 and the hierarchical view 204 are actively linked. This active linkage makes designing and changing the electronic-form template 132 quicker, easier, and more intuitive.

In the block 412, the design application 126 enables a designer to select and alter existing components included in the electronic-form template 132. The design application 126 allows the designer to intuitively and easily alter the views of the electronic-form template 132, such as by including editing tools familiar to designers that know word-processing techniques. A designer can change a component stylistically (such as the font, color, size, and the like) and structurally (such as by changing a text box to a check box, and whether or to which other components the component governs or is subordinate). A designer can make these changes also by altering how a component (such as one displayed as a data-entry field) is represented on the design view 202. For example, a designer can click on a component on the form-design screen 112, change the style, move it, delete it, and the like. As the designer makes changes, the design application 126 alters the hierarchical view to continue to correspond to the altering electronic-form template 132 and its design view 202.

FIG. 8 shows the exemplary design screen 800, which provides another example of the design view 202 and the hierarchical view 204 of an example of the electronic-form template 132. To enable the designer to make changes to a component, the design application 126 (through the user interface 128) enables the designer to click on components displayed in the design view 202 of the electronic-form template 132. One such component, a text box data-entry field 802 (labeled "String 5"), is shown as an example. Once the designer selects a component, in this example the text box data-entry field 802, the design application 126 provides the designer with multiple options to change the data-entry field. As seen in a design screen 900 (described below), the design application 126 provides options in a way comfortable to a designer familiar with common word-processing techniques and icons. If the designer clicked on the text box data-entry field 802 of FIG. 8, the design application 126 can provide multiple pop-up menus of options for the designer.

Figure 9:
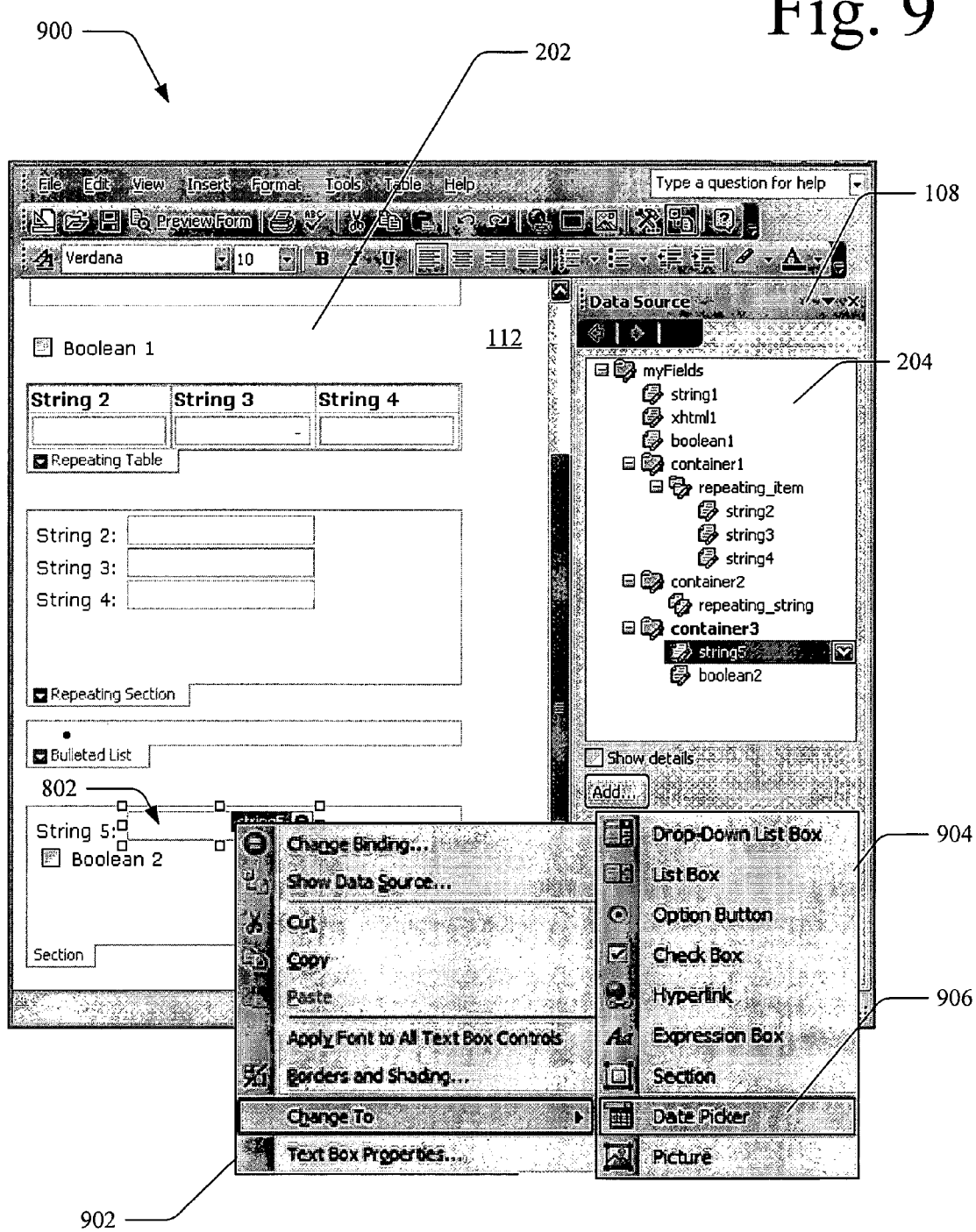
FIG. 9 illustrates the exemplary screen display of FIG. 8 showing also a component context menu and a structure sub-menu.

FIG. 9 sets forth the exemplary design screen 900 including multiple ways in which the design application 126 provides options for a designer. These comprise a component context menu 902 and a structure submenu 904. In this example, the design application 126 enables the designer to change the electronic-form template 132 by changing a representation of a component in the form-design area 112 (such as a data-entry field or accompanying graphics and text). Also, the design application 126 enables the designer to cut the component and move it (through selection and deleting or dragging the component), and change its font, borders, shading, and other style changes (through the component context menu 902), as well as change its structure (through the structure submenu 904). In this example, the designer changes the component by changing the structure of a data-entry field corresponding to the component (the text box data-entry field 802) into a date picker data-entry field by selecting a date picker component 906.

Figure 10:
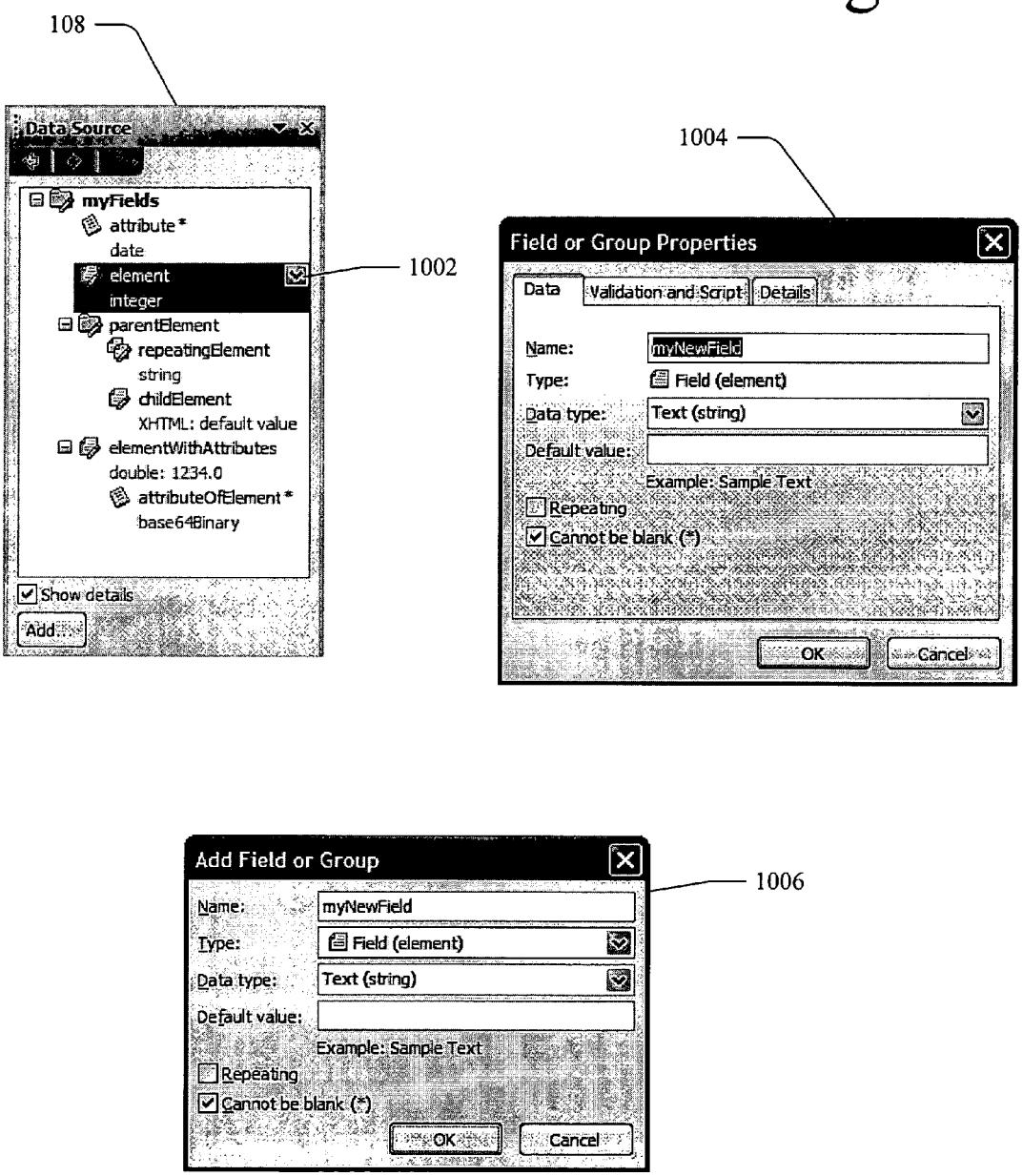
FIG. 10 illustrates an exemplary hierarchical view display area, a change inquiry window, and an add window.

FIG. 10 shows an example of the hierarchical view display area 108, and how it can be used by a designer to alter the electronic-form template 132. In this example, a designer selected an integer node 1002 representing an editability element of the electronic-form template 132. Once chosen, the design application 126 prompts the designer, asking for information, such as through a change inquiry window 1004. Using the window 1004, the design application 126 enables the designer to make various changes to the editability element represented by the node 1002. He can change, for instance, the data type and default value allowed for this editability element in the electronic-form template 132.

Also as part of this example, the design application 126 presents the designer with the current name, type, and data type of a selected editability element. The designer can then make changes by altering these current parameters of a selected editability element, such as set forth in the change inquiry window 1004 by changing the name to "myNewField" from "element" and the data type to "Text (string)" from "Whole Number (integer)" for the editability element represented by the node 1002.

FIG. 10 shows an example of a pop-up window with which the design application 126 can enable a designer to alter editability elements. With an alter window 1006, the designer can add or delete aspects of an editability element, such as a name and repeatability of an element or establish whether or not it is allowed to be blank.

As part of enabling the designer to makes these changes, the design application 126 makes appropriate changes to the electronic-form template 132 and its views. If the designer deletes a component, for instance, the design application 126 may delete the syntax (e.g., the editability element) corresponding to the component from the electronic-form template 132.

According to block 414, when finished, the end product is the electronic-form template 132. One example of an electronic-form template created by the design application 126 is the purchase order example of the design view 202 of FIG. 2. This purchase order electronic-form template 132 can be used by the editor application 130 to present an electronic-form representation of the XML document 134 with appropriate permitted operations. The editor application 130 can enable this electronic-form representation to be edited by an end user, such as by allowing that user to perform an operation like keying in information into some of the data-entry fields. After entry of information, the information can be stored in the XML document 134.

The information stored can conform to the electronic-form template 132, thereby allowing easy use and/or transfer of information stored in the XML document 134. The electronic-form template 132 can be written in various languages, including schemas written to govern markup languages (such as XML). Schemas governing XML documents are commonly called XML Schemas, DTD (Document Type Definition) schemas, and XDR (XML-Data Reduced) schemas.

The electronic-form template 132 can govern many different documents. Because of this, the electronic-form template 132 can be used to enable thousands of different users keying information into thousands of different documents, all of which can be governed by the electronic-form template 132.

More on Editing XML Documents

As discussed in part above, the electronic-form template 132 comprises information by which an application can determine which nodes of an XML document are editable and in what manner. The editor application 130 of FIG. 1 is described above as one embodiment of an application that can use the electronic-form template 132 to aid in editing XML documents. Here the XML document 134 is assumed associated with the electronic-form template 132. This association can be determined in various manners, such as by reading text in the XML document 134 indicating a relationship with the electronic-form template 132.

Figure 11:
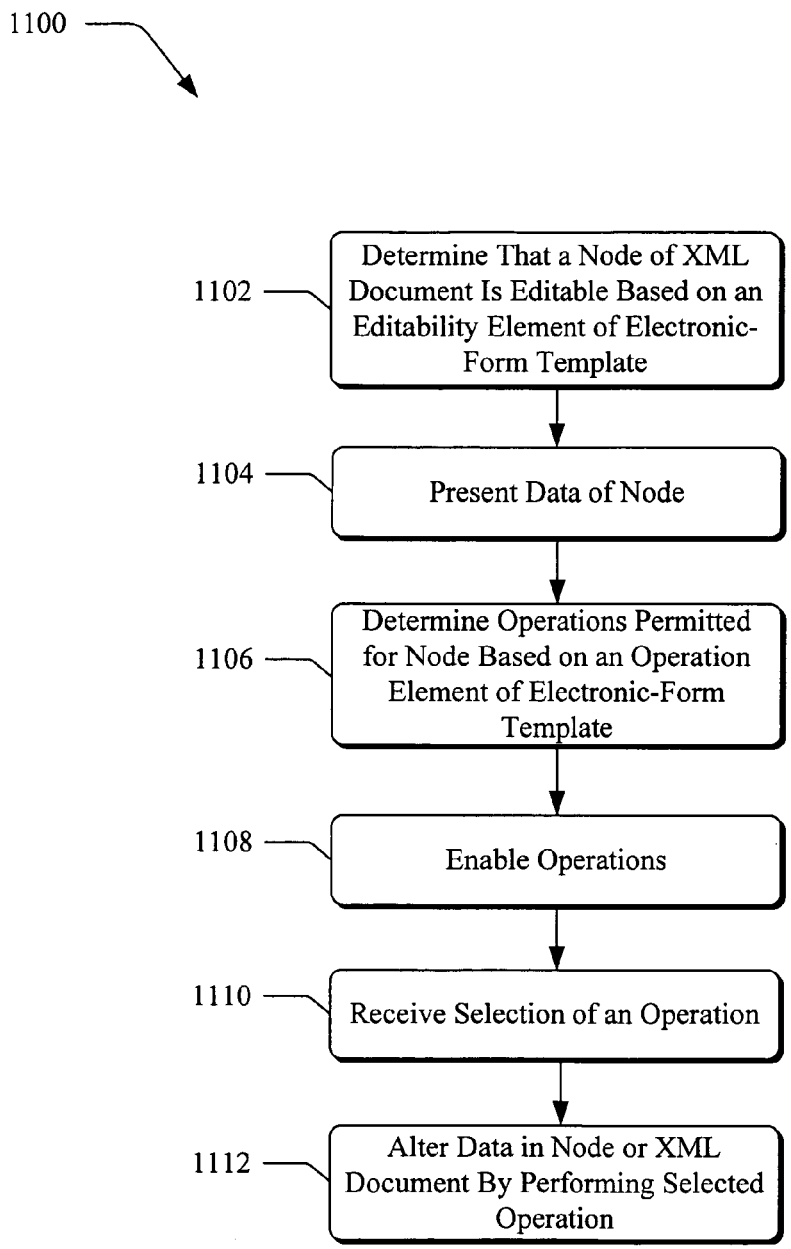
FIG. 11 is a flow diagram of an exemplary process for editing an XML document using an electronic-form template.

FIG. 11 shows a process 1100 for editing the XML document 134. As part of this editing, the editor application 130 uses the electronic-form template 132 to determine which nodes of the XML document 134 are editable. The electronic-form template 132 can also aid the editor application 130 in determining in what way those nodes are editable.

At block 1102, the editor application 130 determines, using the electronic-form template 132, that a node of the XML document 134 is potentially editable. The editor application 130 can do so by reading and analyzing editability elements in the electronic-form template 132.

In one embodiment of the electronic-form template 132, the editability element comprises an indicator with a character string of "xmlToEdit". This string indicates that a node or nodes associated with the indicator are editable (or potentially editable). This editability element also comprises an "item" attribute, which is usable to identify which nodes are editable. An XPath expression identifying the editable nodes is associated with this attribute (the "value" of the attribute). Thus, the editor application 130 can use the XPath expression in the editability element to determine which nodes of the XML document 134 are editable.

For example, if the electronic-form template 132 comprises the following editability element:

```
<xsf:xmlToEdit name="Order"
    item="/Document/Orders/Order" container="/Document" >
    <xsf:editWith component="xCollection"/>
</xsf:xmlToEdit>
``` then the "xmlToEdit" editability element includes an "item" attribute, whose "value" is an XPath expression "/Document/Orders/Order". This XPath expression indicates to the editor application 130 that nodes in the XML document 134 that match this expression are editable (or potentially editable).

At block 1104, with the node or nodes of the XML document 134 identified, the editor application 130 presents data of the editable node. The editor application 130 can present this data using an electronic-form representation of the XML document 134 and/or the editable node. The editor application 130 can do so with aid from the user interface 128 or otherwise.

Figure 12:
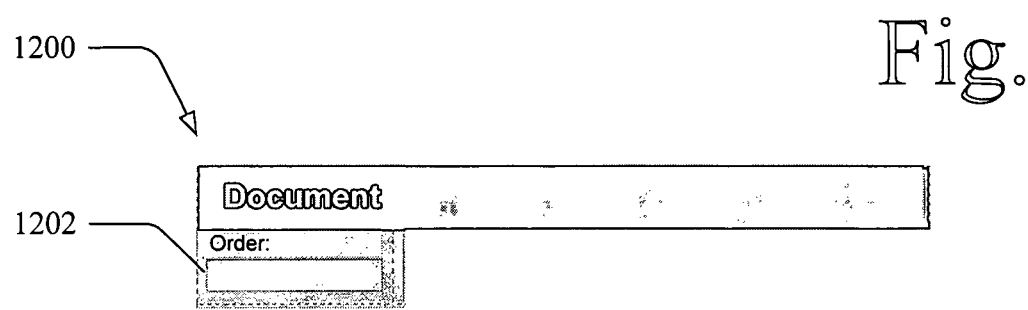
FIG. 12 illustrates an exemplary screen display showing an electronic-form representation of an XML document having one editable node.

FIG. 12 shows an example of an electronic-form representation 1200 of the editable node. Here the editor application 130 presents the data of the editable node as an order data-entry field 1202. As shown, a data-entry field presenting data of an editable node can be blank, such as when no information has been entered into the data-entry field. A data-entry field can also include information previously stored in the editable node, which in some cases can be edited, depending on what operations are permitted for the editable node.

At block 1106, the editor application 130 determines what operations are permitted to be performed on the editable node. This determination can be performed by the editor application 130 prior to presenting the data of the editable node. In some cases determining the operations permitted can affect how data is presented. The editor application 130 determines the permitted operations based on an operation element of the electronic-form template 132, discussed in part above. The operation element and the editability element are associated, such as by the operation element being a child element to the editability element. The operation element indicates operations permitted to be performed on the editable node.

In the ongoing example,

```
<xsf:xmlToEdit name="Order"
    item="/Document/Orders/Order"
    container="/Document" >
    <xsf:editWith component="xCollection"/>
</xsf:xmlToEdit>
``` the operation element comprises a character string of "editWith". This character string indicates to the editor application 130 that the operation element indicates certain types of operations that are permitted. Following this character string, another character sting of "component" is included. This character string can indicate that a value associated with the "component" string that is usable to determine permitted operations.

In the ongoing example, the operation element comprises an operational syntax of "xCollection". This syntax indicates the operations permitted to be performed on nodes of the XML document 134 matching the XPath expression "/Document/Orders/Order".

The editor application 130 can determine the operations associated with this syntax in various ways. The editor application 130 can use this syntax to locate executable code for this operation. In one embodiment of the electronic-form template 132, executable code for operations indicated by various syntaxes are included within the editor application 130.

At block 1108, the editor application 130 enables the permitted operations. The editor application 130 can do so by supplying a user interface appropriate for the permitted operations. For data alteration or addition, the editor application 130 can provide a word-processor-like experience in a data-entry field. Like shown in FIG. 12, the order data-entry field 1202 can be used as a user interface to enter data, delete data, copy and paste data, and the like. Thus, the editor application 130, by determining editable nodes and permitted operations for them, can enable certain types of editing for various editable nodes of the XML document 134.

At block 1110, the editor application 130 receives a selection of an enabled operation. Continuing the ongoing example, the editor application 130 can receive entry of "ACME Tire Company" into the order data-entry field 1202.

At block 1112, the editor application 130 alters data in the editable node (or the editable node itself or associated nodes) of XML document 134 by performing the selected operation. For the ongoing example, the editor application 130 can receive the text "ACME Tire Company" and alter data within the order node to reflect this text. Thus, the editor application 130 can add the text "ACME Tire Company" to the order node.

Other Permitted Operations

The electronic-form template 132 can permit many different types of operations. These comprise, for instance, operations mentioned above and those described below.

The editor application 130 can use the electronic-form template 132 to determine what operations are permitted. With this determination, the editor application 130 can enable permitted operations.

For example, for an editability element of:

```
<xsf:xmlToEdit name="workItem" item="workItems/workItem"
    container="workItems">
    <xsf:editWith component="xCollection" >
        <xsf:fragmentToInsert>
            <xsf:chooseFragment>
                <workItem description="create
                    visuals"></workItem>
            </xsf:chooseFragment>
        </xsf:fragmentToInsert>
    </xsf:editWith>
</xsf:xmlToEdit>
```

The editor application 130 can determine that the electronic-form template 132, for the node(s) indicated by "workItems/workItem", permits an operation of inserting nodes adjacent to this "workItem" node (or under the node corresponding to the container attribute: "workItems"). In this example, the operation element comprises a syntax of "xCollection", which indicates a permitted operation of inserting or deleting subnodes adjacent to the editable node indicated by "workItems/workItem".

This operation, however, is conditional based on a context element (here an attribute of the editability element). This context is given by a value for a "container" attribute. Here, the container attribute's value is given by a syntax "workItems". This syntax comprises a XPath expression. Thus, the editor application 130 can determine, based on the syntax given, that operations are not permitted unless a node locatable with the XPath expression "workItems" is exposed. The editor application 130 can determine if the "workItems" node (the parent of the "workItems/workItem" node) is exposed, if a section associated with it is exposed in an electronic-form rendering of the "workItems" node. If the editor application 130 is rendering the XML document 134, the editor application 130 can determine if the "workItems" node is exposed by checking whether it or its user interface has exposed the node.

Additional information useful in performing operations can also be included in the electronic-form template 132. For the example immediately above, syntax can also be included in the operation element to indicate what data is to be inserted in the XML document by the operations. This syntax comprises a "fragmentToInsert" child element to the editability element. Using this information, the editor application 130 can determine that a child element of the fragmentToInsert element contains the data to be inserted.

In this example, a child element having a character string of "chooseFragment" indicates that new XML content corresponding to the XML markup: "<workItem description="create visuals"></workItem>" can be inserted next to the "workItem" node.

In a similar way, the electronic-form template 132 editability element provides syntax permitting deletion of the editable node or nodes using the syntax of "xCollection".

Also by way of example, for an editability element of:

```
<xsf:xmlToEdit name="author" item="issue/@author "
    container="issue">
    <xsf:editWith component="xOptional">
        <xsf:fragmentToInsert>
            <xsf:chooseFragment>
                <xsf:attributeData attribute="author"
                    value="author name"/>
            </xsf:chooseFragment>
        </xsf:fragmentToInsert>
    </xsf:editWith>
</xsf:xmlToEdit>
``` a node or nodes located with the XPath expression of "item/@author" has a permitted operation associated with the syntax "xOptional". This operation element comprises a character string of "editWith" and "component". The syntax following "component" (i.e., "xOptional") can be used by the editor application 130 to determine operations permitted for the editable node(s) indicated by the XPath expression "item/@author".

Like above, this operation, however, is conditional based on a context element (here an attribute of the editability element). This context is given by the value of the "container" attribute, in this case: "issue".

For the example immediately above, a syntax "fragmentToInsert" can be used by the editor application 130 to determine where and what to insert. Thus, the character string of "chooseFragment" indicates that an "author" attribute node having an value: "author name" is permitted to be added to the "issue" node.

Unlike the operation element having a syntax of "xCollection", the operation element corresponding to an "editWith" element whose "component" attribute value has the value "xOptional", permits addition of only one node. It also permits that node (locatable with "item/@author") to then be deleted.

In another embodiment of the operation element, an attribute of the operation element indicates textual operations permitted on data of the editable node. This indication corresponds to an "editWith" element whose "component" attribute value has the value "xField", indicating that textual operations are permitted. Various types of textual operations may also be included in the electronic-form template 132.

For example, for an editability element of:

```
<xsf:xmlToEdit item="description/textItem">
    <xsf:editWith component="xField" type="rich" />
</xsf:xmlToEdit>
``` a node or nodes located with the XPath expression of "description/textItem" has a permitted operation specified by "editWith" and "component". A value of "component", here "xField", can be used to indicate that textual editing of data of the editable node is permitted. A value of "type", here "rich", can be used to indicate that rich-text editing is permitted. Thus, the syntax following "component" of "xField" and "rich" can be used by the editor application 130 to determine that rich-text editing of data of the editable node(s) indicated by the XPath expression "item/@author" is permitted.

In another embodiment of the "xField" operation element above, a type attribute given by a syntax "plain" indicates that an operation for creation and modification of plain-text-data (but not rich-text-formatted data) of the editable node is permitted.

FIG. 13, for example, shows an electronic-form representation 1300 of an example of the XML document 134. Here many different nodes are presented and operations enabled. For instance, the electronic form 1300 shows data-entry fields enabling plain-text operations to be performed, referenced at numerals 1302 and 1304. It also shows enabling of other operations: a repeating table shown at numeral 1306; a bulleted list at 1308; and an optional section at 1310. Editability elements for these enabled operations can be represented in the electronic-form template 132 with:

```
<xsf:xmlToEdit          name="term_115"
item="/po:Document/po:terms/po:term" >
    <xsf:editWith component="xTextList"/>
</xsf:xmlToEdit>
<xsf:editWith caption="notes" component="xOptional" >
    <xsf:fragmentToInsert>
        <xsf:chooseFragment>
            <po:notes/>
        </xsf:chooseFragment>
    </xsf:fragmentToInsert>
</xsf:editWith>
```

A Computer System

Figure 14:
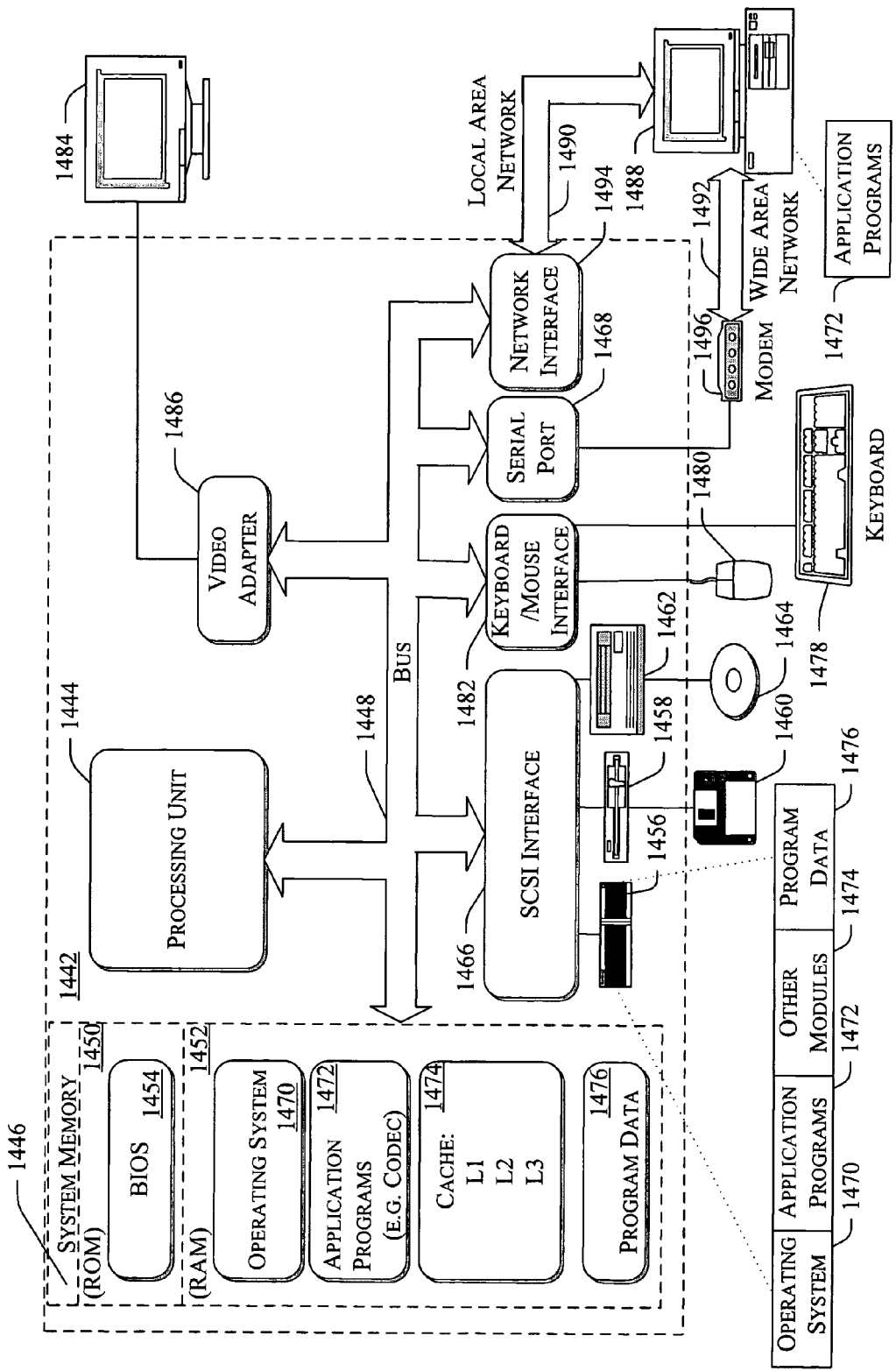
FIG. 14 is a block diagram of a computer system that is capable of supporting processes for creation and use of an electronic-form template.

FIG. 14 shows an exemplary computer system that can be used to implement the processes described herein. Computer 1442 comprises one or more processors or processing units 1444, a system memory 1446, and a bus 1448 that couples various system components including the system memory 1446 to processors 1444. The bus 1448 represents one or more of any of several types of bus structures, including a memory bus or memory controller, a peripheral bus, an accelerated graphics port, and a processor or local bus using any of a variety of bus architectures. The system memory 1446 comprises read only memory (ROM) 1450 and random access memory (RAM) 1452. A basic input/output system (BIOS) 1454, containing the basic routines that help to transfer information between elements within computer 1442, such as during start-up, is stored in ROM 1450.

Computer 1442 further comprises a hard disk drive 1456 for reading from and writing to a hard disk (not shown), a magnetic disk drive 1458 for reading from and writing to a removable magnetic disk 1460, and an optical disk drive 1462 for reading from or writing to a removable optical disk 1464 such as a CD ROM or other optical media. The hard disk drive 1456, magnetic disk drive 1458, and optical disk drive 1462 are connected to the bus 1448 by an SCSI interface 1466 or some other appropriate interface. The drives and their associated computer-readable media provide nonvolatile storage of computer-readable instructions, data structures, program modules and other data for computer 1442. Although the exemplary environment described herein employs a hard disk, a removable magnetic disk 1460 and a removable optical disk 1464, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1456, magnetic disk 1460, optical disk 1464, ROM 1450, or RAM 1452, including an operating system 1470, one or more application programs 1472 (such as the design application 126 and the editor application 130), other program modules 1474, and program data 1476. A user may enter commands and information into computer 1442 through input devices such as a keyboard 1478 and a pointing device 1480. Other input devices (not shown) may comprise a microphone, joystick, game pad, satellite dish, scanner, or the like. These and other input devices are connected to the processing unit 1444 through an interface 1482 that is coupled to the bus 1448. A monitor 1484 or other type of display device is also connected to the bus 1448 via an interface, such as a video adapter 1486. In addition to the monitor, personal computers typically comprise other peripheral output devices (not shown) such as speakers and printers.

Computer 1442 commonly operates in a networked environment using logical connections to one or more remote computers, such as a remote computer 1488. The remote computer 1488 may be another personal computer, a server, a router, a network PC, a peer device or other common network node, and typically comprises many or all of the elements described above relative to computer 1442. The logical connections depicted in FIG. 14 comprise a local area network (LAN) 1490 and a wide area network (WAN) 1492. Such networking environments are commonplace in offices, enterprise-wide computer networks, intranets, and the Internet.

When used in a LAN networking environment, computer 1442 is connected to the local network through a network interface or adapter 1494. When used in a WAN networking environment, computer 1442 typically comprises a modem 1496 or other means for establishing communications over the wide area network 1492, such as the Internet. The modem 1496, which may be internal or external, is connected to the bus 1448 via a serial port interface 1468. In a networked environment, program modules depicted relative to the personal computer 1442, or portions thereof, may be stored in the remote memory storage device. It will be appreciated that the network connections shown are exemplary and other means of establishing a communications link between the computers may be used.

Generally, the data processors of computer 1442 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described system and method enables an end user to edit an XML document is ways permitted by an electronic-form template. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. One or more computer-readable media comprising computer-executable instructions that perform the following when executed by one or more computers:
    presenting extensible markup language (XML) data of a first XML document in a user interface having a form display area; a component selection tool; and a data source area, wherein:
        the form display area displays the XML data of the first XML document in an electronic form representation having one or more data-entry fields representing one or more nodes of the first XML document;
        the component selection tool is selectable to permit a designer to insert and place components into the form display area for inclusion in the first XML document; and
        the data source area displays the XML data of the first XML document in a hierarchal tree representation concurrently with the electronic form representation of the first XML document in the form display area;
    enabling one or more operations through interaction with a component in the electronic form representation;
    receiving selection of an operation of the one or more operations; and
    modifying the XML data of the first XML document corresponding to the component in the electronic form based on the received operation, wherein:
        the act of presenting comprises determining that a node of the first XML document corresponding to the component is identified in a first element in a second XML document;
        the act of enabling comprises determining that the operations are identified in a second element associated with the first element in the second XML document; and
        the act of modifying the XML data causes modifications to the XML data to be concurrently reflected in the electronic form representation and the hierarchal tree representation.

2. The media of claim 1, wherein the act of determining that the node is identified comprises determining that the first element comprises a character string of "xmlToEdit".

3. The media of claim 1, wherein the act of determining that the node is identified comprises determining that a location of the node matches an XPath expression determinable from a value of an attribute on the first element.

4. The media of claim 1, wherein the act of determining that the node is identified comprises determining that the first element comprises a character string of "item" and that a value associated with that character string is usable to determine an XPath expression matching a location of the node.

5. The media of claim 1, wherein the act of determining that the operations are identified comprises determining that the second element comprises a character string of "editWith".

6. The media of claim 1, wherein the act of determining that the operations are identified comprises determining that the second element comprises a character string of "component" and a value associated with the character string, and using the value to determine the operations.

7. The media of claim 1, wherein the act of presenting comprises determining that the second XML document comprises a namespace having a namespace resource indicator having a character string of either "microsoft" or "infopath".

8. The media of claim 1, wherein the first XML document comprises data not represented with XML.

9. The media of claim 1, wherein the act of determining that the operations are identified comprises determining that the second element comprises an attribute indicating that the operations comprise insertion or deletion of the identified node, or of a sibling node to the identified node.

10. The media of claim 9, wherein the value of the attribute comprises a character string of "xCollection".

11. The media of claim 9, wherein the value of the attribute comprises a character string of "xOptional".

12. The media of claim 9, wherein the act of determining that the operations are identified further comprises determining: (a) that the second element indicates that the operations comprise insertion of the nodes; and (b) a location where the nodes are to be inserted based on one or more character strings in the first element, the character strings being treatable as an XPath expression.

13. The media of claim 9, further comprising determining a location for the insertion with an XPath expression associated with a character string of "item" in the first element.

14. The media of claim 9, further comprising determining the identified node or the sibling of the identified node using a child element of the second element, the child element comprising a character string "chooseFragment."

15. The media of claim 14, further comprising determining a location for inserting the identified node or the sibling of the identified node using an XPath expression associated with an additional character string of the child element.

16. The media of claim 1, wherein the act of determining that the operations are identified comprises determining that the second element comprises an attribute indicating that the operations comprise addition to or alteration of data within the identified node.

17. The media of claim 16, wherein the act of determining that the second element comprises the attribute comprises determining that a value of the attribute comprises a character string of "xField".

18. The media of claim 17, wherein the act of determining that the operations are identified further comprises determining that the second element comprises a second attribute having a character string of "type".

19. The media of claim 18, wherein the act of determining that the operations are identified further comprises determining that the second attribute is associated with a character string of "rich" and the act of enabling one or more operations comprises enabling creation and modification of rich-text-data within the identified node.

20. The media of claim 18, wherein the act of determining that the operations are identified further comprises determining that the second attribute is associated with a character string of "plain" and the act of enabling one or more operations comprises enabling creation and modification of plain-text-data within the identified node.

21. One or more computer-readable media comprising computer-executable instructions that perform the following when executed by one or more computers:
    outputting a user interface having a form display area; a data soured area; and a component selection tool;
    presenting a first extensible markup language (XML) document in the form display area as an electronic form having one or more data-entry fields representing one or more nodes of the first XML document, wherein the component selection tool is selectable to permit a designer to select components for inclusion in the first XML document and place the selected components in the form display area;
    presenting the first XML document in a hierarchal tree representation in the data source area; and
    enabling an operation to be performed on one of the nodes through its data-entry field, wherein:
        the one node is identified in a 'xmlToEdit' element comprising a character string of "xmlToEdit" in a second XML document;
        the operation enabled to be performed on the one node is identified in a child element of the 'xmlToEdit' element, the child element comprising a character string of "editWith"; and
        when performed, the operation enabled to be performed causes a modification of data corresponding to the one node in the first XML document, the modification being concurrently reflected in the electronic form and the hierarchal tree representation.

22. The media of claim 21, wherein the one node is identified by an XPath expression associated with a value of an "item" attribute in the 'xmlToEdit' element.

23. The media of claim 21, wherein the operation to be performed is identified by a value of a "component" attribute in the child element.

24. The media of claim 21, wherein the act of enabling the operation comprises enabling the operation only if the electronic form comprises a representation of a context node, and wherein the context node is identified in a "container" attribute of the 'xmlToEdit' element.

25. A computer-implemented method comprising:
    outputting a user interface to present an extensible markup language (XML) document, the user interface including:
        a form display area to display an electronic form representation of the XML document;
        a data source area to display a hierarchal tree representation of the XML document; and
        a component selection tool selectably displayable and operable by a user to select components for the electronic form representation including one or more data entry field components for inclusion in the XML document;
    responsive to user interaction with the component selection tool, receiving a selection of one or more components and arranging the one or more components in the electronic form representation of the XML document in form display area;
    enabling one or more operations through interaction with the one or more components arranged in the electronic form representation of the XML document;
    receiving a selection of one said operation of the one or more operations through interaction with one said component; and
    modifying the one said component based on the received operation, wherein the act of modifying the one said component causes modifications to the XML document that are concurrently reflected in the electronic form representation in the form display area and the hierarchal tree representation in the data source area.

* * * * *